United States Patent
Kanno

(10) Patent No.: US 11,513,707 B2
(45) Date of Patent: *Nov. 29, 2022

(54) MEMORY SYSTEM AND METHOD OF CONTROLLING NONVOLATILE MEMORY

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 17/154,185

(22) Filed: Jan. 21, 2021

(65) Prior Publication Data
US 2021/0165571 A1 Jun. 3, 2021

Related U.S. Application Data

(63) Continuation of application No. 16/282,078, filed on Feb. 21, 2019, now Pat. No. 10,936,226.

(30) Foreign Application Priority Data

May 22, 2018 (JP) .............................. JP2018-097907

(51) Int. Cl.
  *G06F 3/06* (2006.01)
  *G06F 12/02* (2006.01)
  *H04L 9/08* (2006.01)
(52) U.S. Cl.
  CPC .............. *G06F 3/064* (2013.01); *G06F 3/062* (2013.01); *G06F 3/0679* (2013.01); *G06F 12/0246* (2013.01); *H04L 9/08* (2013.01)
(58) Field of Classification Search
  None
  See application file for complete search history.

(56) References Cited

U.S. PATENT DOCUMENTS

| | | |
|---|---|---|
| 9,342,465 B1 | 5/2016 | Meiri |
| 2005/0114686 A1 | 5/2005 | Ball et al. |
| 2012/0017097 A1 | 1/2012 | Walrath |
| 2012/0233472 A1 | 9/2012 | Faraboschi et al. |
| 2013/0036312 A1 | 2/2013 | Anquet et al. |

(Continued)

FOREIGN PATENT DOCUMENTS

CN 107168885 A 9/2017

OTHER PUBLICATIONS

Yiying ZHANG et al., "De-indirection for Flash-based SSDs with Nameless Writes", 10th USENIX Conference on File and Storage Technologies (FAST '12), Feb. 14-17, 2012, 16 Pages downloaded on Sep. 13, 2017 from: https://www.usenix.org/system/files/conference/fast12/zhang.pdf.

*Primary Examiner* — Charles Rones
*Assistant Examiner* — Ryan Dare
(74) *Attorney, Agent, or Firm* — Oblon, McClelland, Maier & Neustadt, L.L.P.

(57) ABSTRACT

According to one embodiment, when data is to be written to a first physical storage location that is designated by a first physical address, a memory system encrypts the data with the first physical address and a first encryption key, and writes the encrypted data to the first physical storage location. When the encrypted data is to be copied to a second physical storage location, the memory system decrypts the encrypted data with the first physical address and the first encryption key, and re-encrypts the decrypted data with a second encryption key and a copy destination physical address indicative of the second physical storage location.

20 Claims, 16 Drawing Sheets

(56) References Cited

U.S. PATENT DOCUMENTS

2015/0293858 A1 10/2015 Raam
2017/0262176 A1 9/2017 Kanno
2019/0034110 A1 1/2019 Liu et al.

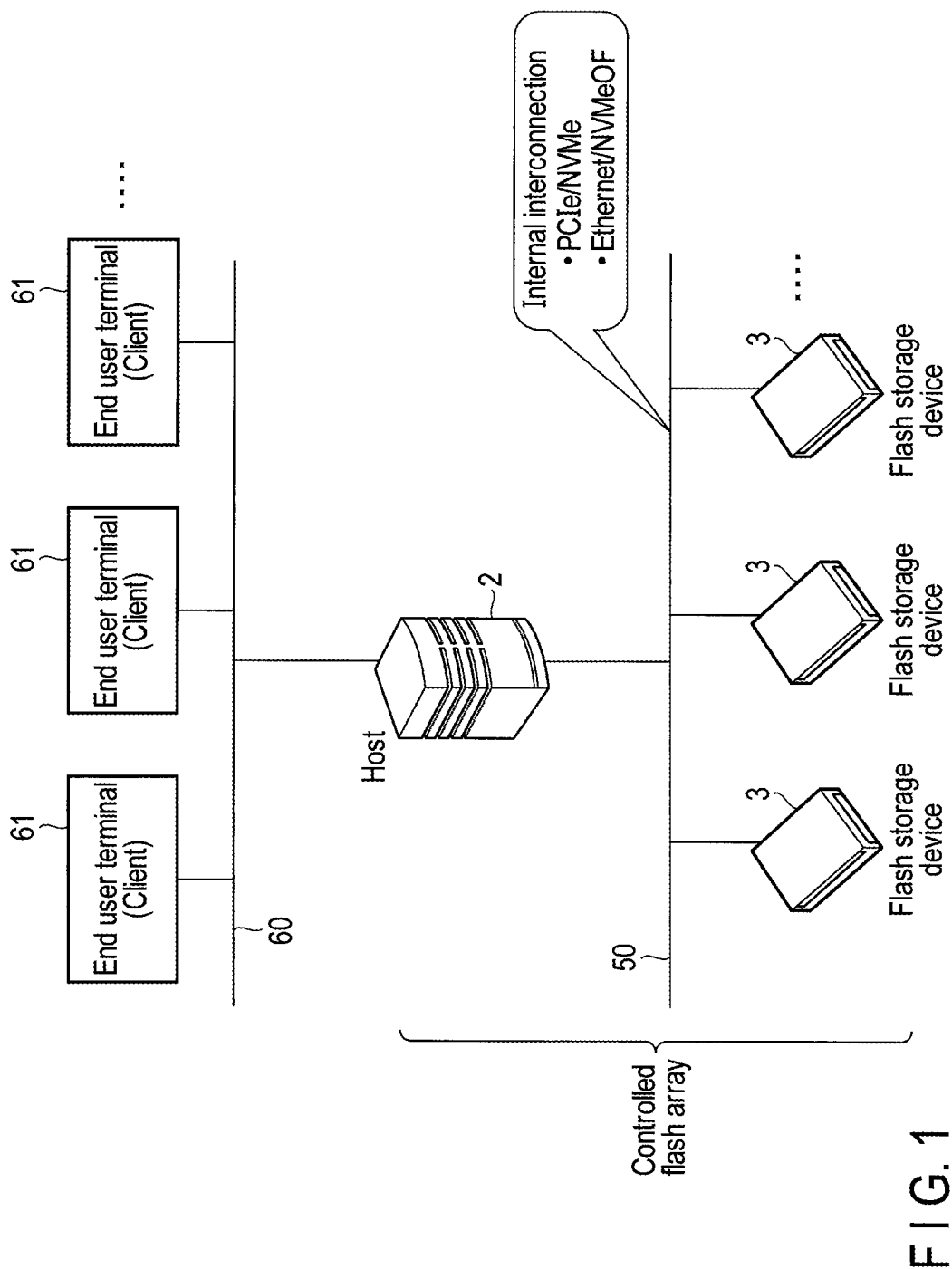
F I G. 1

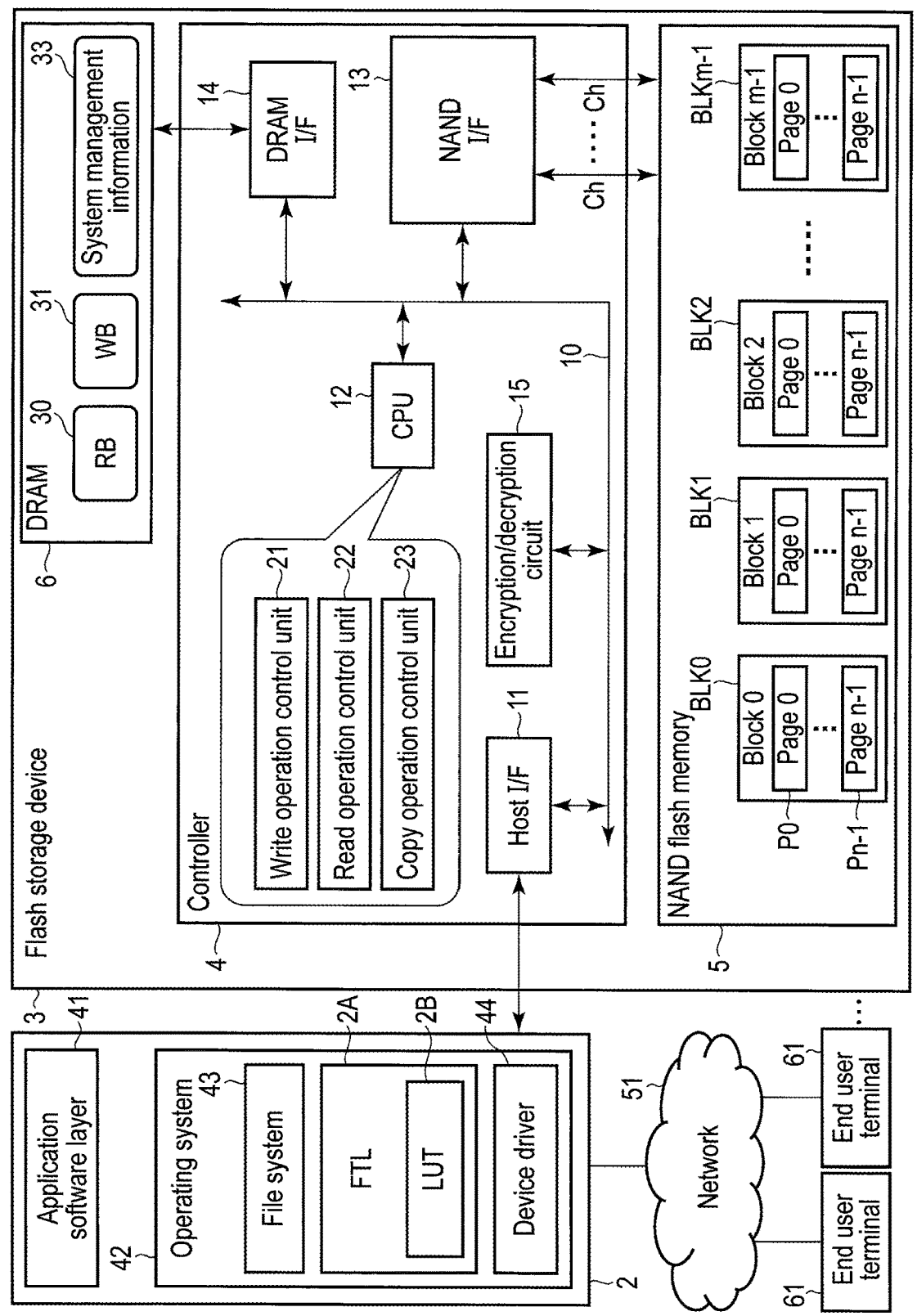
F I G. 2

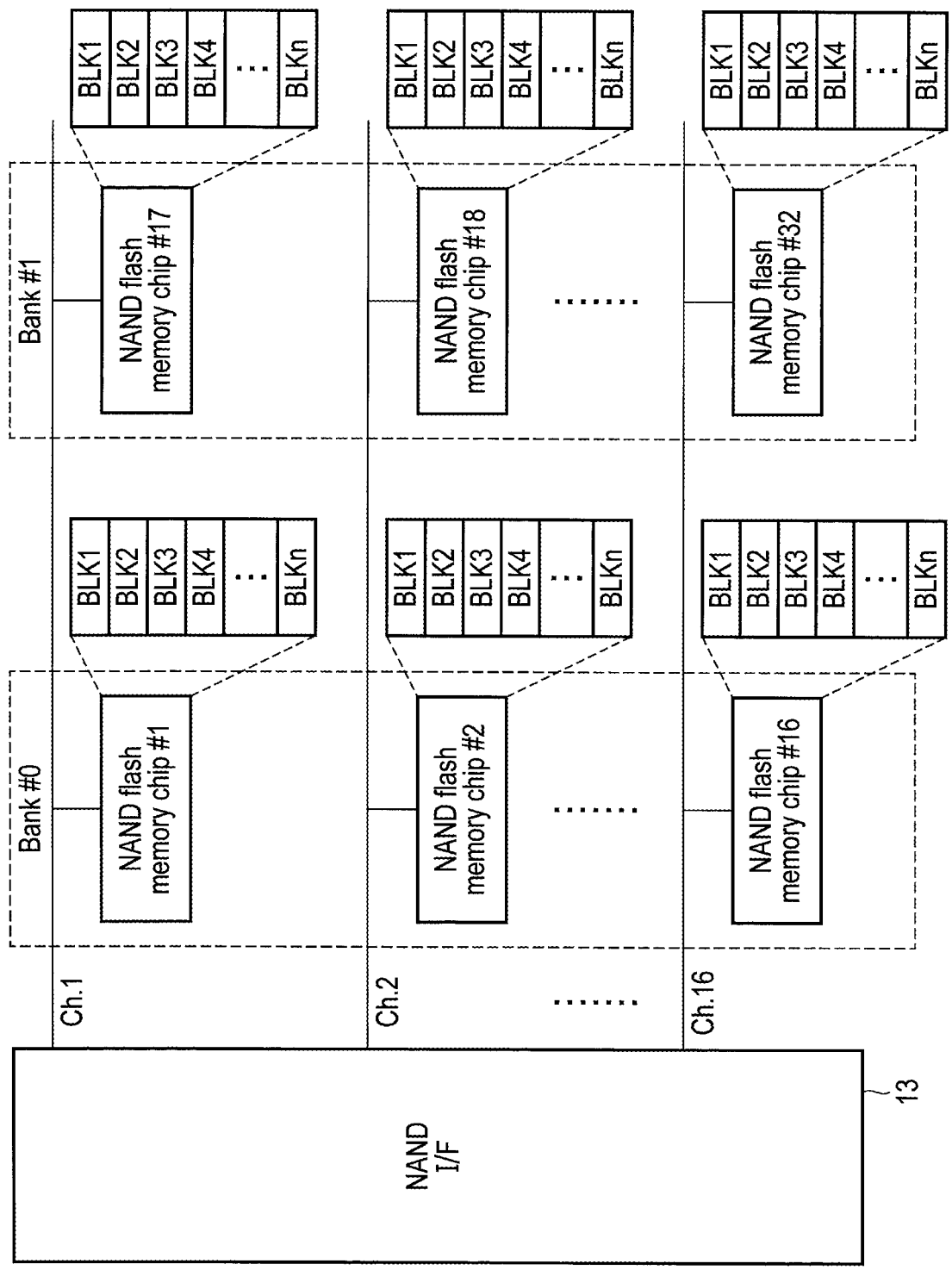
F I G. 3

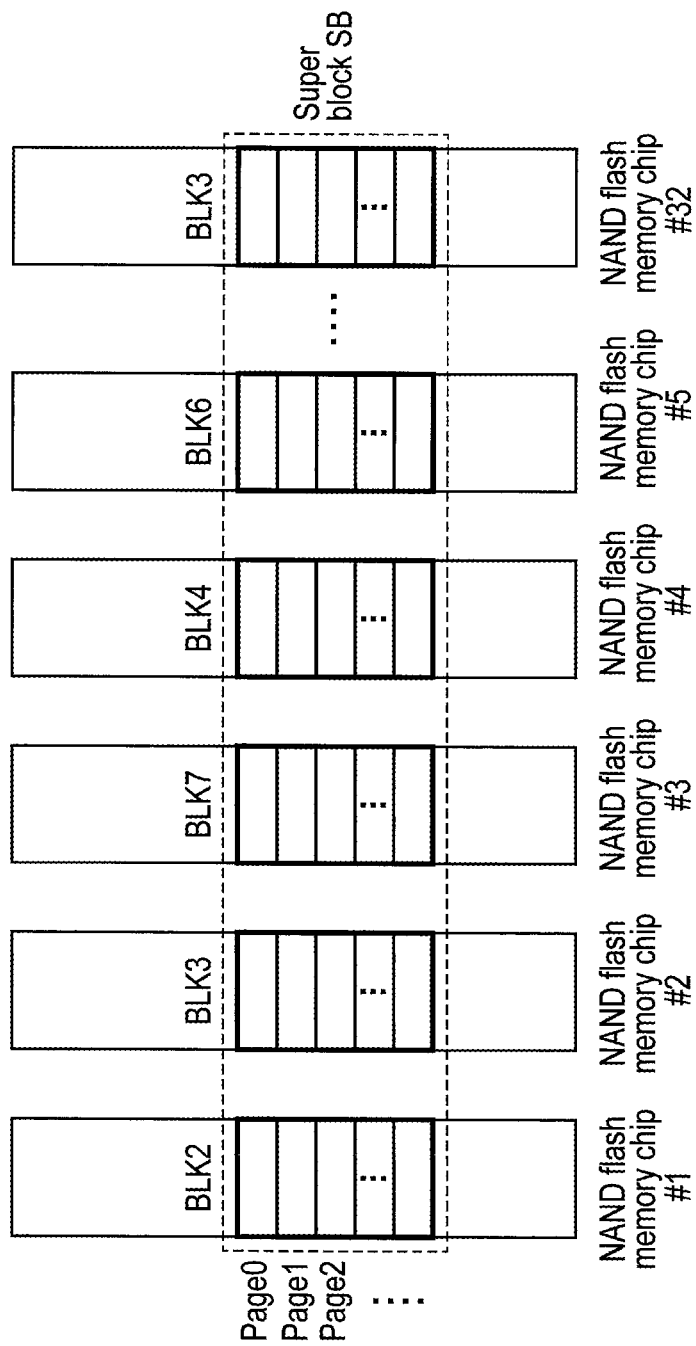
F I G. 4

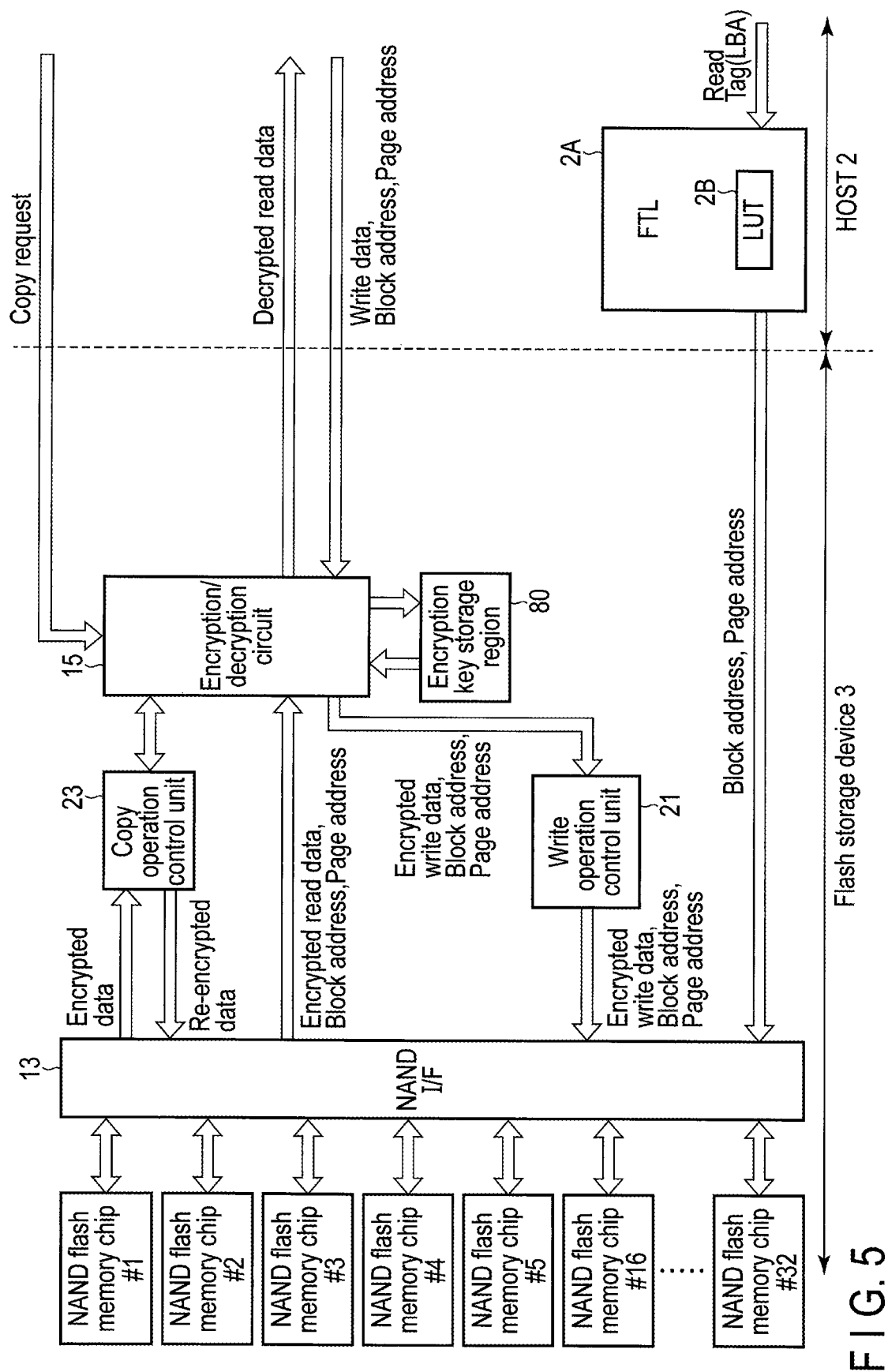
F I G. 5

Namespace/encryption key management table 33A'

| Namespace ID | Encryption keys |
|---|---|
| NS#0 | KEY#0 |
| NS#1 | KEY#1 |
| NS#2 | KEY#2 |
| NS#3 | KEY#3 |
| NS#4 | KEY#4 |
| ⋮ | ⋮ |
| NS#k | KEY#k |

F I G. 7

Block/encryption key management table 33B

| Block addresses | Encryption keys |
|---|---|
| BLK#0 | KEY#0 |
| BLK#1 | KEY#1 |
| BLK#2 | KEY#2 |
| BLK#3 | KEY#3 |
| BLK#4 | KEY#4 |
| ⋮ | ⋮ |

F I G. 8

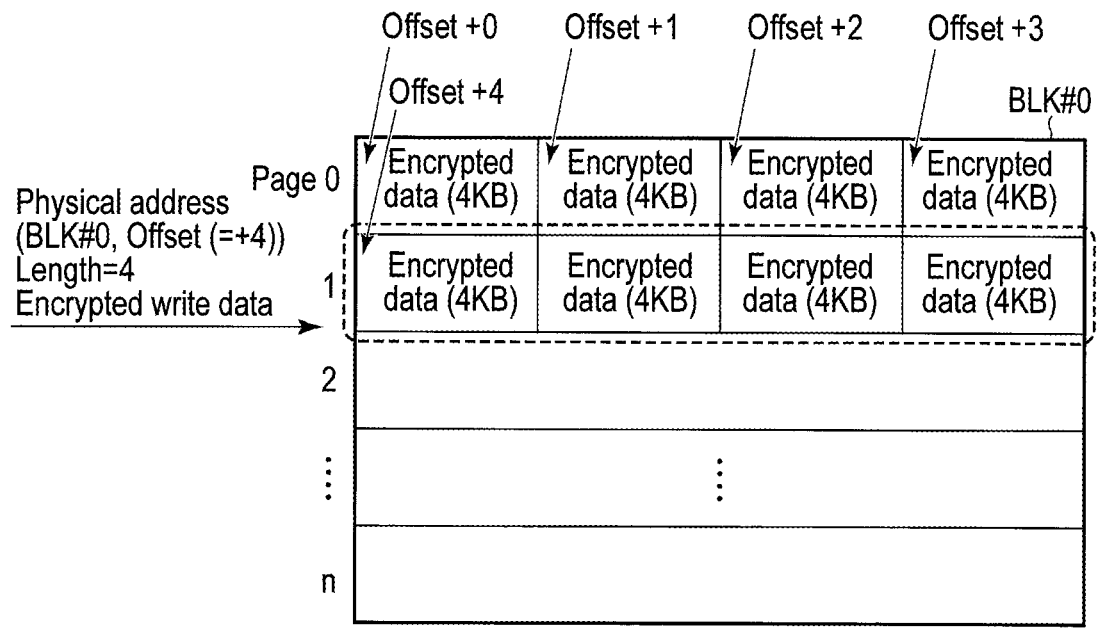
F I G. 9
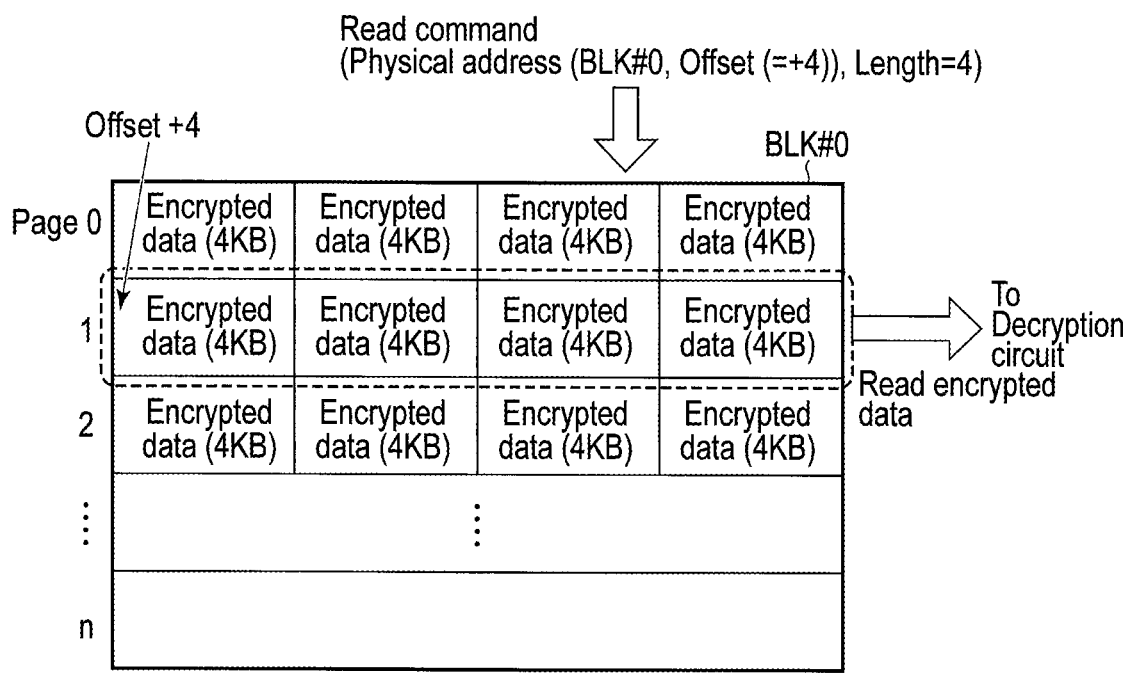
F I G. 10

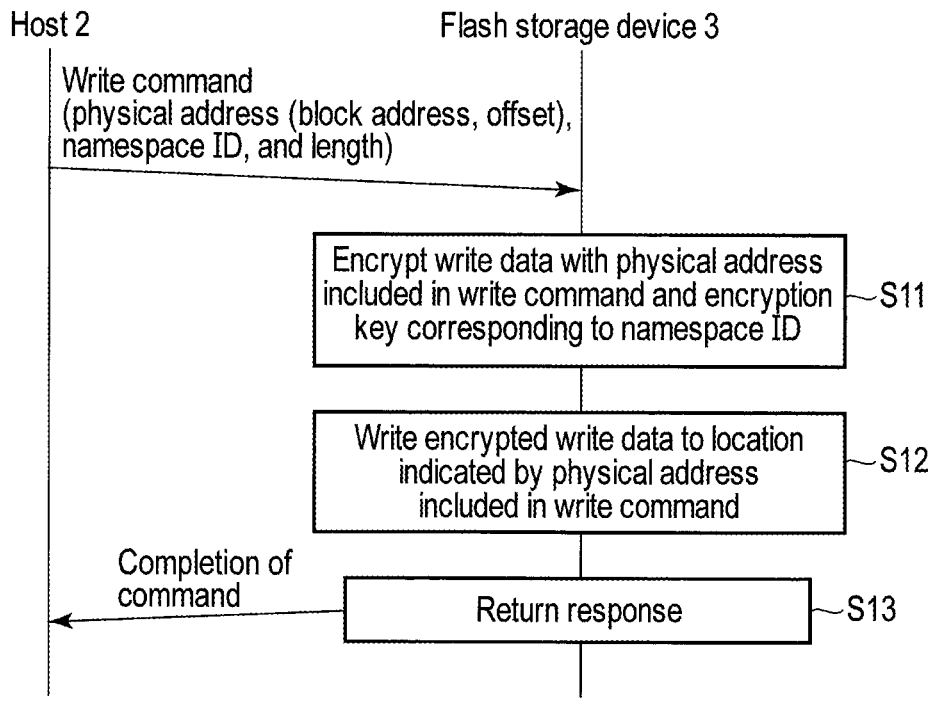
F I G. 11
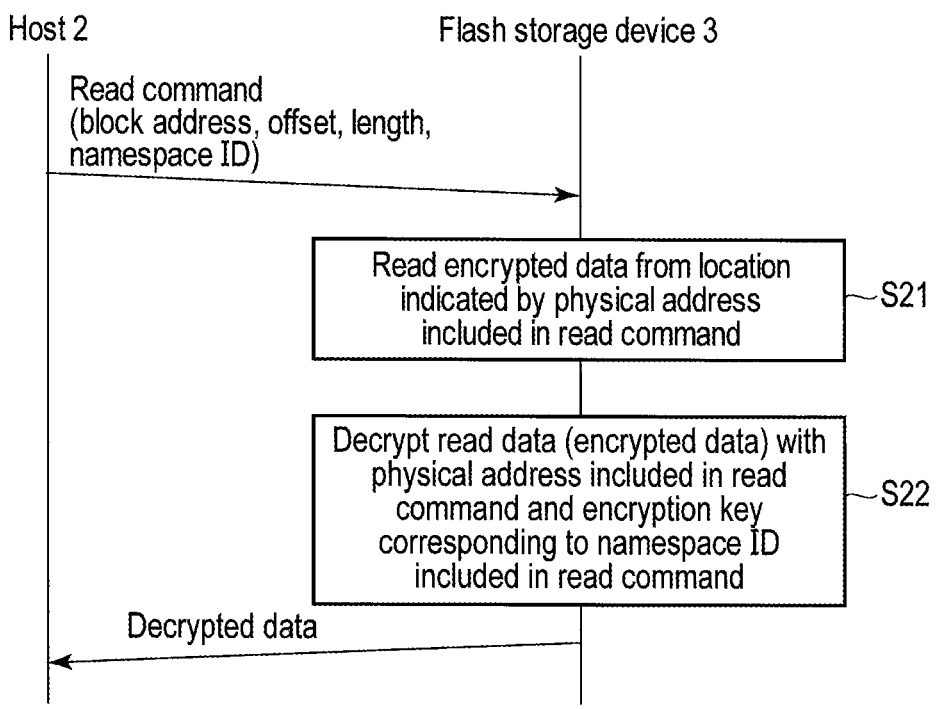
F I G. 12

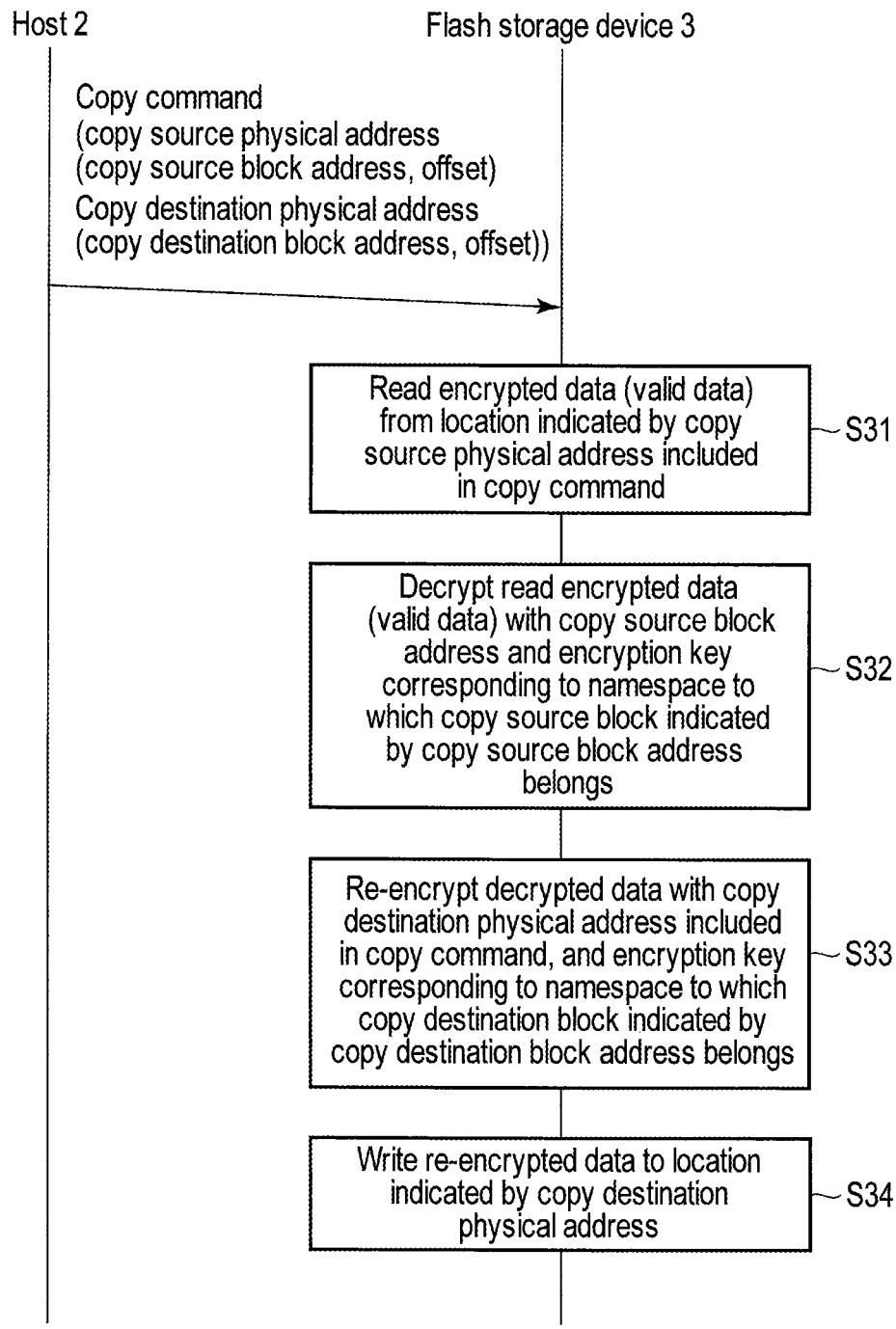
F I G. 13

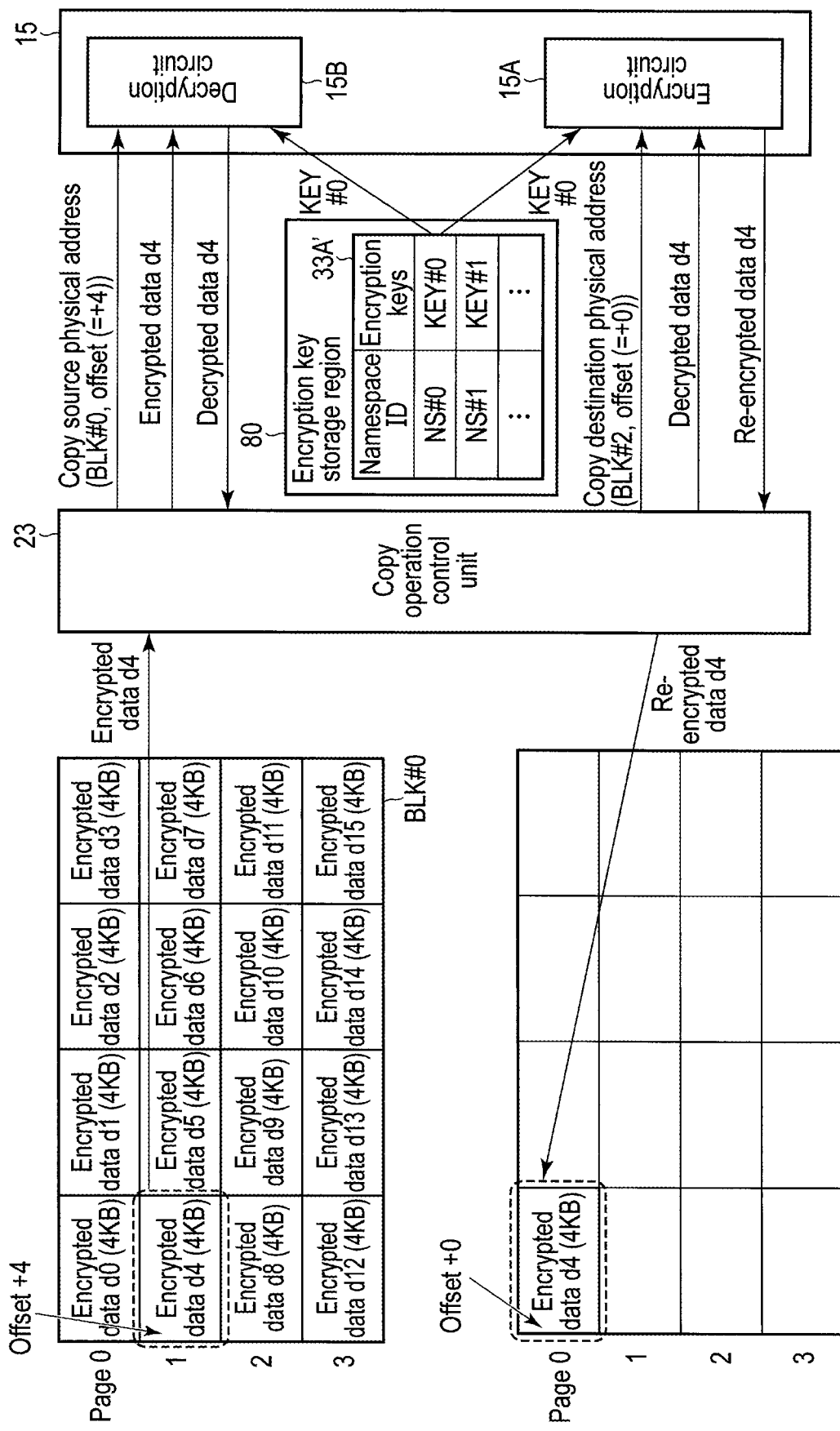
F I G. 14

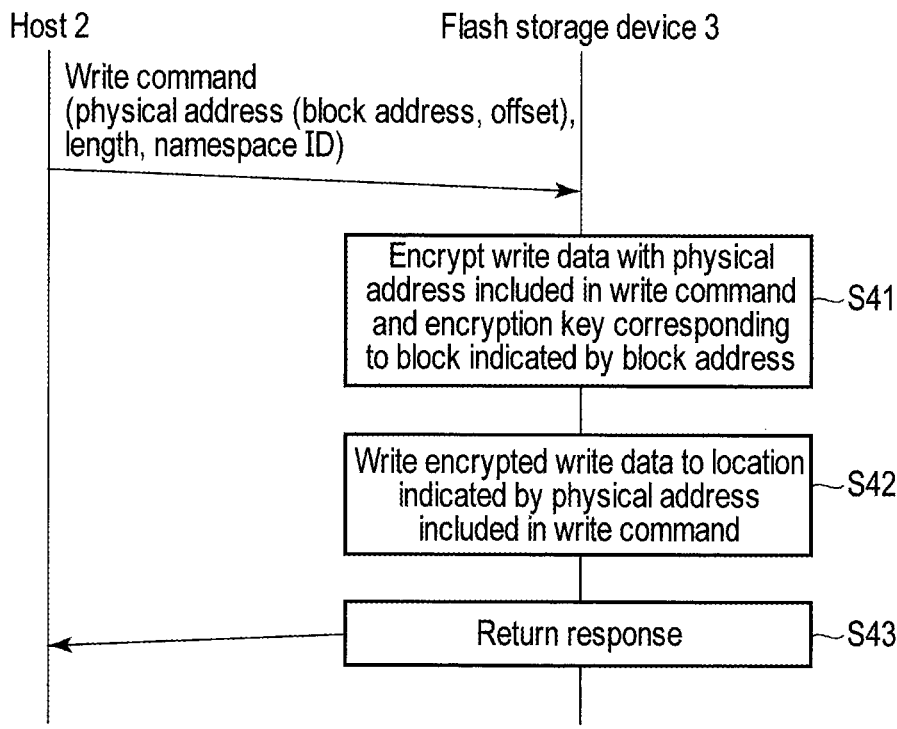
F I G. 15
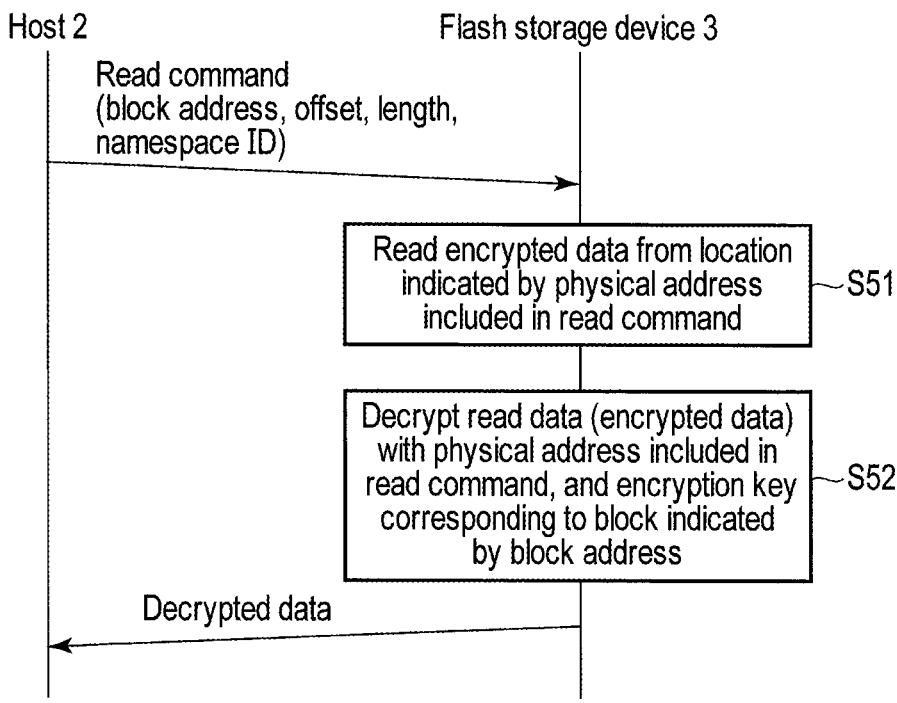
F I G. 16

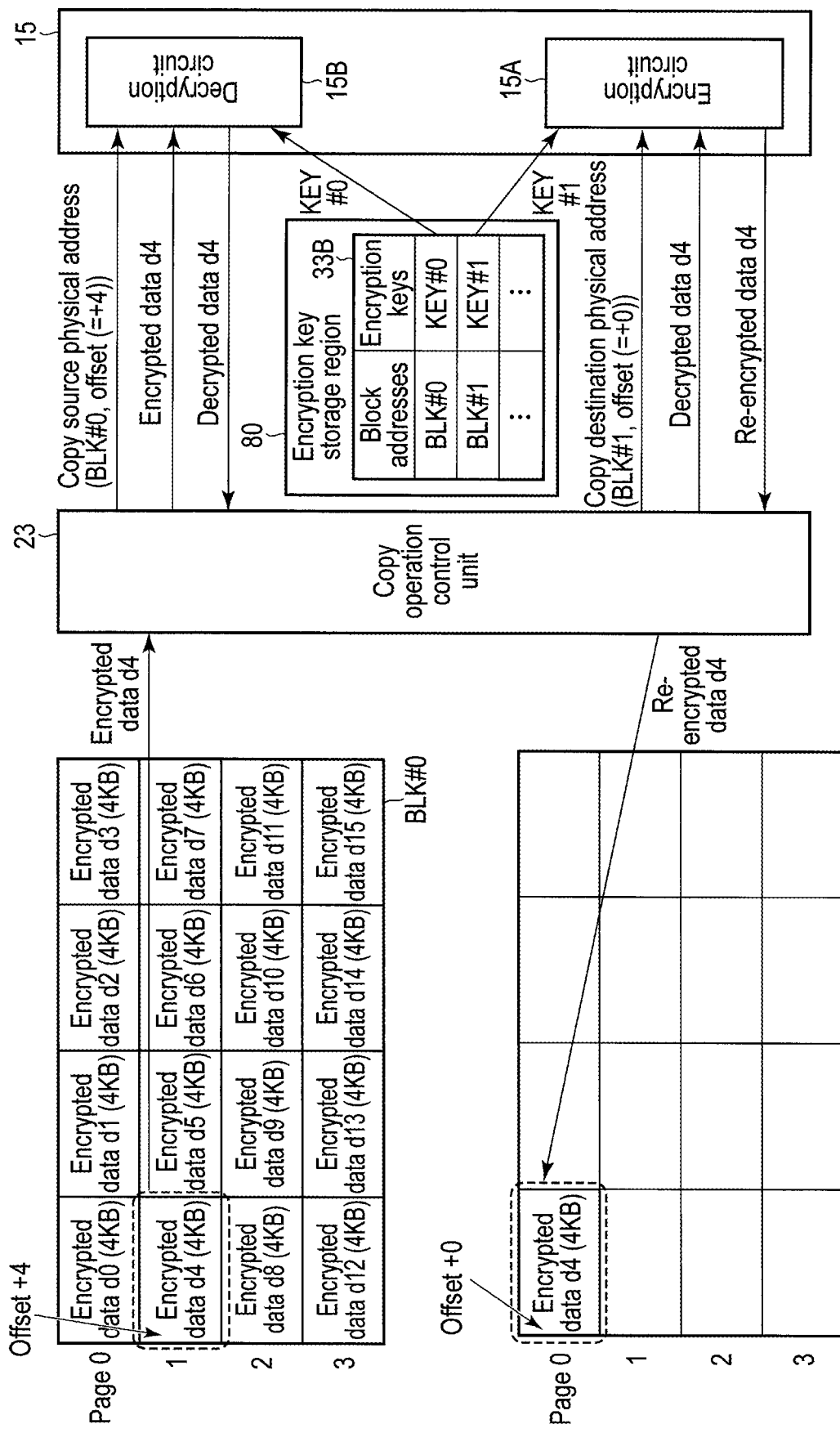
F I G. 18

Write command

| Parameter | Description |
|---|---|
| Command ID | Identify this command as write command |
| Namespace ID | Indicate namespace to which data is to be written |
| Physical address (PBA) | Indicate first physical storage location to which data is to be written |
| Length | Length of data to be written |

F I G. 19

Read command

| Parameter | Description |
|---|---|
| Command ID | Identify this command as read command |
| Namespace ID | Indicate namespace from which data is to be read |
| Physical address (PBA) | Indicate first physical storage location from which data is to be read. Physical address can be designated by block address and offset |
| Length | Length of data to be read (data length can be designated by number of Grain) |

F I G. 20

Copy command

| Parameter | Description |
|---|---|
| Command ID | Identify this command as copy command |
| Copy source physical address | Indicate physical storage location where data to be copied is stored. Copy source physical address can be designated by copy source block address and offset |
| Copy destination physical address | Indicate physical storage location to which data to be copied is to be written. Copy destination physical address can be designated by copy destination block address and offset |

F I G. 21

MEMORY SYSTEM AND METHOD OF CONTROLLING NONVOLATILE MEMORY

CROSS-REFERENCE TO RELATED APPLICATIONS

This application is a continuation Application of U.S. application Ser. No. 16/282,078, filed Feb. 21, 2019, which is based upon and claims the benefit of priority from Japanese Patent Application No. 2018-097907, filed May 22, 2018, the entire contents of which are incorporated herein by reference.

FIELD

Embodiments described herein relate generally to a technology of controlling a nonvolatile memory.

BACKGROUND

In recent years, memory systems including nonvolatile memories have been widely prevalent. As such memory systems, a solid state drive (SSD) based on a NAND flash technology is known.

The memory systems such as an SSD are used as storage devices for various computers such as a server computer or a personal computer.

In recent memory systems such as an SSD, a capability of encrypting and decrypting data is also required.

BRIEF DESCRIPTION OF THE DRAWINGS

FIG. 1 is a block diagram illustrating a configuration example of a computing system including a memory system according to an embodiment.

FIG. 2 is a block diagram illustrating a configuration example of the memory system according to the embodiment.

FIG. 3 is a block diagram illustrating a relationship between plural NAND flash memory chips and plural channels, which are used in the memory system according to the embodiment.

FIG. 4 is a diagram illustrating a configuration example of a super block in the memory system according to the embodiment.

FIG. 5 is a diagram illustrating an outline of each operation executed in the memory system according to the embodiment, together with a flow of data and a physical address.

FIG. 7 is a namespace ID/encryption key management table managed in the memory system according to the embodiment.

FIG. 8 is a block/encryption key management table managed in the memory system according to the embodiment.

FIG. 9 is a diagram illustrating a write operation executed in response to a write command.

FIG. 10 is a diagram illustrating a read operation executed in response to a read command.

FIG. 11 is a sequence chart illustrating a sequence of write processing executed in a host and the memory system according to the embodiment.

FIG. 12 is a sequence chart illustrating a sequence of read processing executed in the host and the memory system according to the embodiment.

FIG. 13 is a sequence chart illustrating a sequence of copy processing executed in the host and the memory system according to the embodiment.

FIG. 14 is a diagram illustrating an example of a data copy operation executed in the memory system according to the embodiment.

FIG. 15 is a sequence chart illustrating another sequence of write processing executed in the host and the memory system according to the embodiment.

FIG. 16 is a sequence chart illustrating another sequence of read processing executed in the host and the memory system according to the embodiment.

FIG. 18 is a diagram illustrating still another example of a data copy operation executed in the memory system according to the embodiment.

FIG. 19 is a table illustrating a write command issued to the memory system according to the embodiment.

FIG. 20 is a table illustrating a read command issued to the memory system according to the embodiment.

FIG. 21 is a table illustrating a copy command issued to the memory system according to the embodiment.

DETAILED DESCRIPTION

Figure 6:
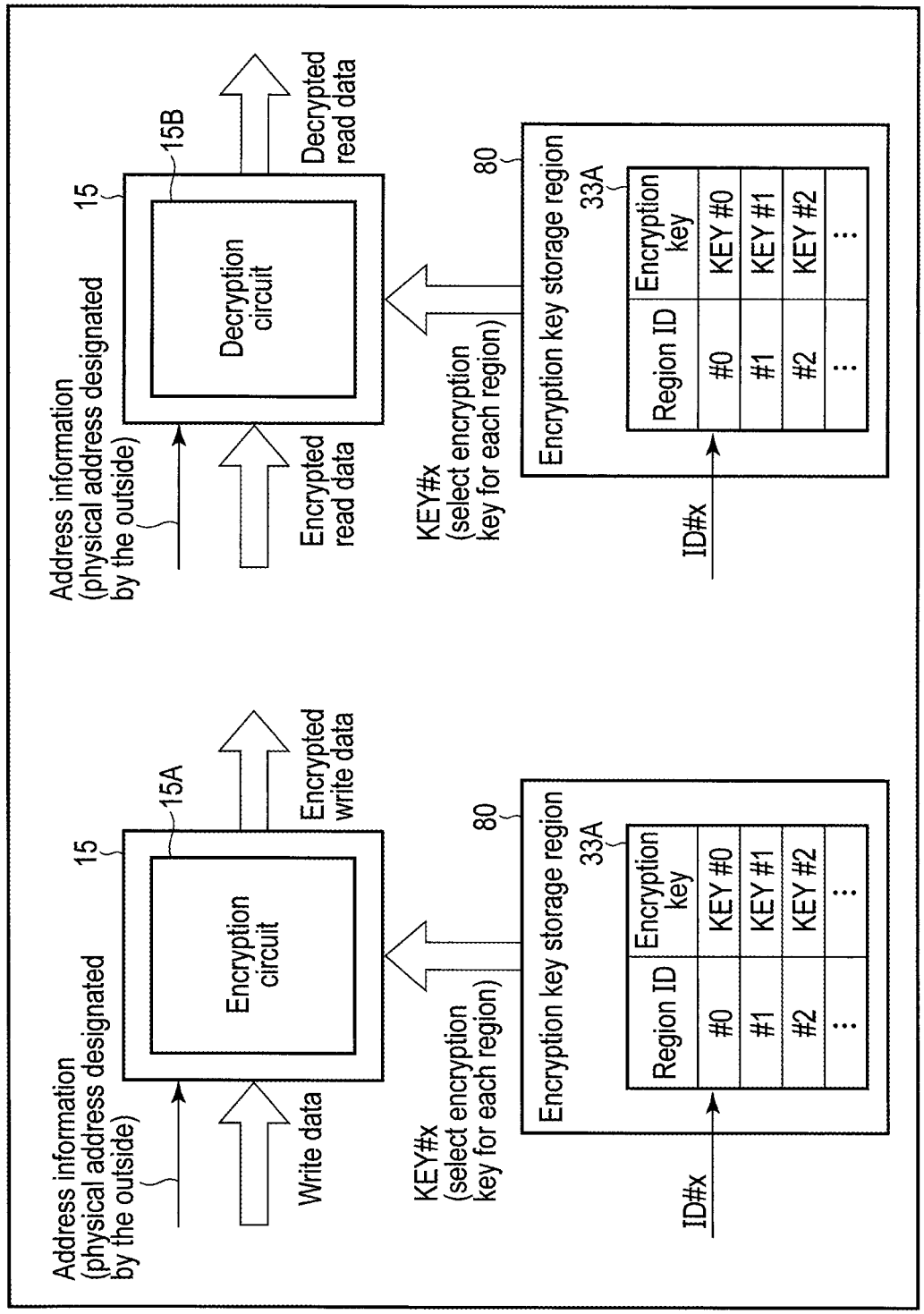
FIG. 6 is a diagram illustrating data encrypting and decrypting operations executed in the memory system according to the embodiment.

Various embodiments will be described hereinafter with reference to the accompanying drawings.

In general, according to one embodiment, a memory system comprises a nonvolatile memory and a controller electrically connected to the nonvolatile memory. When data is to be written to a first physical storage location of the nonvolatile memory that is designated by a first physical address, the controller encrypts the data with the first physical address and a first encryption key selected from a plurality of keys, and writes the encrypted data to the first physical storage location.

When the encrypted data is to be copied from the first physical storage location to a second physical storage location of the nonvolatile memory, the controller decrypts the encrypted data with the first physical address and the first encryption key, re-encrypts the decrypted data with a second encryption key selected from the plurality of encryption keys and a copy destination physical address indicative of the second physical storage location, and writes the re-encrypted data to the second physical storage location.

First, a configuration of a computing system including a memory system according to one embodiment will be described with reference to FIG. 1.

The memory system is a semiconductor storage device configured to write data to a nonvolatile memory and to read data from the nonvolatile memory. The memory system is implemented as a flash storage device 3 based on a NAND flash technology.

The computing system may include a host (host device) 2 and plural flash storage devices 3. The host 2 may be a server configured to use a flash array composed of plural flash storage devices 3 as a storage. The host (server) 2 and the flash storage devices 3 are interconnected via an interface 50 (internal interconnection). The interface 50 for the internal interconnection is not limited, but may be PCI Express (PCIe) (registered trademark), NVM Express (NVMe) (registered trademark), Ethernet (registered trademark), NVMe over Fabrics (NVMeOF), and the like.

A typical example of a server functioning as the host 2 is a server in a data center.

In a case where the host 2 is implemented as a server in a data center, the host (server) 2 may be connected to plural end user terminals (clients) 61 via a network 60. The host 2 can provide various services to the end user terminals 61.

Examples of the services which can be provided by the host (server) 2 are (1) Platform as a Service (PaaS) that provides a system running platform to each client (each end user terminal 61), (2) Infrastructure as a Service (IaaS) that provides an infrastructure such as a virtual server to each client (each end user terminal 61), and the like.

Plural virtual machines may be executed on a physical server which functions as the host (server) 2. Each of the virtual machines running on the host (server) 2 can function as a virtual server configured to provide various services to several corresponding clients (end user terminals 61).

The host (server) 2 has a storage management function of managing plural flash storage devices 3 constituting a flash array, and a front-end function of providing various services including the storage access to each of the end user terminals 61.

In a conventional SSD, a block/page hierarchical structure of a NAND flash memory is concealed by a flash translation layer (FTL) in the conventional SSD. In other words, FTL of the conventional SSD has (1) a function of managing mapping between each of the logic addresses and each of the physical addresses of the NAND flash memory, by using a lookup table which functions as a logical-to-physical address translation table, (2) a function of concealing read/write in a page unit and an erase operation in a block unit, (3) a function of executing a garbage collection (GC) of the NAND flash memory, and the like. Mapping between each of the logical addresses and each of physical addresses of the NAND flash memory cannot be seen from the host. The block/page structure of the NAND flash memory cannot be seen from the host either.

In the host, too, a type of address translation (application-level address translation) is often executed. This address translation manages mapping between each of the application-level logical addresses and each of the logical addresses for the SSD, by using an application-level address translation table. In addition, in the host, too, a type of GC (application-level GC) for change of data placement in the logical address space is executed for cancellation of a fragment which occurs in the logical address space for the SSD.

In such a redundant configuration in which each of the host and the SSD includes the address translation table (the SSD includes the lookup table functioning as the logical-to-physical address translation table whereas the host includes the application-level address translation table), enormous volumes of memory resources are used to hold these address translation tables. Furthermore, double address translation including the address translation on the host side and the address translation on the SSD side is also a factor which degrades I/O performance.

Moreover, the application-level GC on the host side might become a factor which increases the amount of data written to the SSD to several times of the amount of actual user data. Such increase of the data write amount degrades the storage performance of the whole system and shortens the life of the SSD along with write amplification of the SSD.

Thus, in the present embodiment, the role of FTL is shared by the host 2 and the flash storage device 3.

In general, in data write processing, the host 2 sends a write request designating a physical address indicative of a physical storage location in a block of the NAND flash memory to which data is to be written, to the flash storage device 3, and the flash storage device 3 writes the data to the physical storage location in this block. The physical address included in each write request includes a block address designating the block to which the data is to be written, and an in-block physical address (block offset) indicative of the physical storage location in this block to which the data is to be written. The block offset is indicative of offset from the beginning of this block to the physical storage location. This block offset may be represented by a page address and a page offset.

Alternatively, the block offset may be represented by a multiple of granularity (grain) having a predetermined size. The grain may have a size smaller than the page size. For example, if the page size is 16K bytes, the grain may have the size of 4K bytes. In this case, plural offset locations each having a size of 4K bytes are defined in a certain block. The block offset corresponding to the first offset location in the block is, for example, zero, the block offset corresponding to the subsequent offset location in the block is, for example, one, and the block offset corresponding to the further subsequent offset location in the block is, for example, two.

In data read processing, the host 2 sends a read request designating a physical address indicative of a physical storage location in a block of the NAND flash memory where the data to be read is stored, to the flash storage device 3, and the flash storage device 3 reads the data from the physical storage location in this block. The physical address included in the read request is also represented by a block address and a block offset, similarly to the physical address included in the write request.

Thus, when the host 2 sends the read/write request designating the physical address to the flash storage device 3, the host 2 can directly control a data placement in the flash storage device 3.

The flash storage device 3 is configured to execute an encryption/decryption operation. The encryption/decryption operation includes an operation of encrypting data when the data is to be written to the NAND flash memory, and an operation of decrypting the encrypted data when the encrypted data is to be read from the NAND flash memory.

The encryption/decryption operation encrypts data not only with an encryption key, but with both an encryption key and the address included in the write request. In a case of encrypting data with an encryption key alone, encryption results corresponding to two data portions including the same content (i.e., the same data pattern) are the same. In contrast, in a case of encrypting data with an encryption key and the address, encryption results corresponding to two data portions are not the same even if each of the data portions including the same content (i.e., the same data pattern) is encrypted. Therefore, the encryption method of encrypting data with an encryption key and the address can obtain higher security than that of encrypting data with an encryption key alone.

In the present embodiment, as explained above, not a logical address such as LBA, but a physical address indicative of the physical storage location in the block is designated by the read/write request. Therefore, in the data write processing, data is encrypted with a certain encryption key (first encryption key) and a physical address included in the write request, and the encrypted data is written to written to a certain physical storage location in a certain block indicated by the physical address (first physical address) included in the write request. In the read processing for reading the encrypted data, the encrypted data is read from this block, and the read encrypted data is decrypted with the encryption key (first encryption key) and the physical address included in the read request. Since this physical address is the same as the physical address (first physical address) used for the data encryption, the encrypted data can be decrypted correctly.

However, if the encrypted data is copied to a copy destination physical storage location of another block, a physical address included in the read request to read the data stored in the copy destination physical storage location is different from the physical address (first physical address) used for the data encryption. Therefore, as regards the encrypted data copied to the copy destination physical storage location, if the address (physical address) included in the read request to read the data stored in the copy destination physical storage location is used for decryption of the encrypted data, the encrypted data cannot be decrypted correctly.

For this reason, in the present embodiment, when the encrypted data is to be copied to a certain physical storage location (copy destination physical storage location) in another block (copy destination block), the flash storage device 3 first decrypts the data with the encryption key (first encryption key) and the physical address (first physical address) indicative of the physical storage location where the encrypted data is stored. Then, the flash storage device 3 re-encrypts the decrypted data with the certain encryption key and the copy destination physical address indicative of the copy destination physical storage location in the copy destination block, and writes the re-encrypted data to the copy destination physical storage location in the copy destination block. As a result, since the physical address included in the read request to read the data stored in the copy destination physical storage location becomes the same as the physical address (copy destination physical address) used to re-encrypt the data, the re-encrypted data can be decrypted correctly.

FIG. 2 illustrates a configuration example of the flash storage device 3.

The flash storage device 3 includes a controller 4 and a nonvolatile memory (NAND flash memory) 5. The flash storage device 3 may include a random access memory, for example, a DRAM 6.

The NAND flash memory 5 includes a memory cell array including plural memory cells arranged in a matrix. The NAND flash memory 5 may be a NAND flash memory of a two-dimensional structure or a NAND flash memory of a three-dimensional structure.

The memory cell array of the NAND flash memory 5 includes plural blocks BLK0 to BLKm−1. Each of the blocks BLK0 to BLKm−1 includes plural pages (pages P0 to Pn−1 in the embodiment). The blocks BLK 0 to BLK m−1 function as an erase unit. The blocks may be called erase blocks, physical blocks or physical erase blocks. The pages P0 to Pn−1 are a unit for a data write operation and a data read operation.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be implemented by a circuit such as a System-on-a-chip (SoC).

As illustrated in FIG. 3, the NAND flash memory 5 may include plural NAND flash memory chips (NAND flash memory dies). Each of the NAND flash memory chips can operate independently. For this reason, the NAND flash memory chips function as parallel operation units. FIG. 3 illustrates an example in which 16 channels Ch.1 to Ch.16 are connected to the NAND interface 13, and 2 NAND flash memory chips are connected to each of 16 channels Ch.1 to Ch.16. In this case, 16 NAND flash memory chips #1 to #16 connected to channels Ch.1 to Ch.16 may be organized as bank #0, and the other 16 NAND flash memory chips #17 to #32 connected to channels Ch.1 to Ch.16 may be organized as bank #1. The banks function as units for operating plural memory modules in parallel by bank interleaving. In the configuration example of FIG. 3, a maximum of 32 NAND flash memory chips can be operated in parallel by 16 channels and bank interleaving using 2 banks.

The erase operation may be executed in one block (physical block) unit or in a unit of a super block including a set of plural blocks which can execute the parallel operation. Each super block is not limited to this but may include a total of 32 blocks selected from respective NAND flash memory chips #1 to #32. Each of NAND flash memory chips #1 to #32 may comprise a multi-plane configuration. For example, when each of NAND flash memory chips #1 to #32 comprises a multi-plane configuration including two planes, each super block may include a total of 64 blocks selected from respective 64 planes corresponding to NAND flash memory chips #1 to #32.

FIG. 4 illustrates an example of a single super block SB including 32 blocks (block BLK2 in NAND flash memory chip #1, block BLK3 in NAND flash memory chip #2, block BLK7 in NAND flash memory chip #3, block BLK4 in NAND flash memory chip #4, block BLK6 in NAND flash memory chip #5, . . . , block BLK3 in NAND flash memory chip #32).

One block designated by the block address included in a read/write/copy request may be a super block including a set of blocks (physical blocks) which can be accessed parallel or may be a physical block. A configuration in which each super block includes only one physical block may be employed and, in this case, one super block is equivalent to one physical block.

As illustrated in FIG. 2, the controller 4 includes a host interface 11, a CPU 12, a NAND interface 13, a DRAM interface 14, an encryption/decryption circuit 15, and the like. The host interface 11, the CPU 12, the NAND interface 13, the DRAM interface 14, and the encryption/decryption circuit 15 are interconnected via the bus 10.

The host interface 11 is a host interface circuit configured to execute communication with the host 2. The host interface 11 may be, for example, a PCIe controller (NVMe controller). The host interface 11 receives various requests (commands) from the host 2. The requests (commands) include a write request (write command), a read request (read command), a copy request (copy command), and other various requests (commands).

The CPU 12 is a processor configured to control the host interface 11, the NAND interface 13, the DRAM interface 14, and the encryption/decryption circuit 15. The CPU 12 loads a control program (firmware) from the NAND flash memory 5 or a ROM (not illustrated) to the DRAM 6 upon power-on of the flash storage device 3 and executes various processing by executing the firmware. The firmware may be loaded into an SRAM (not illustrated) in the controller 4. The CPU 12 can execute command processing for processing various commands transmitted from the host 2, and the like. The operations of the CPU 12 are controlled by the above-described firmware executed by the CPU 12. Several parts or all of the command processing may also be executed by dedicated hardware in the controller 4.

The CPU 12 can function as a write operation control unit 21, a read operation control unit 22, and a copy operation control unit 23. Several parts or all parts of each of the write operation control unit 21, the read operation control unit 22, and the copy operation control unit 23 may also be implemented by dedicated hardware in the controller 4.

The write operation control unit 21 receives from the host 2 a write request (write command) designating a physical address indicative of a physical storage location in the NAND flash memory 5 to which data is to be written. As explained above, the physical address includes a block address indicative of a block to which the data is to be written, and the in-block physical address (block offset) indicative of a location (physical storage location) in the block, to which the data is to be written. The block address is a block identifier designating a block to which the data is to be written. Various numbers that can uniquely identify any one of the blocks included in the NAND flash memory 5 can be used as the block address. For example, the block address may be represented by a set of a chip address indicative of a certain NAND flash memory chip and a block number indicative of a certain block within this NAND flash memory chip. The block designated by the block address may be a physical block or the above-explained super block.

The write command may further designate a region ID. More specifically, the controller 4 can manage plural regions obtained by logically dividing the NAND flash memory 5. Each of the regions may include several blocks. The region ID is an identifier which designates any region of the plural regions. One region may be allocated to each end user (tenant). In this case, the read/write request from user application corresponding to each end user (tenant) may include a region ID indicative of a region used by the end user (tenant).

In the present embodiment, plural encryption keys for encrypting data (user data) received from the host 2 are managed in the controller 4.

Encryption of the data (user data) may be executed using different encryption keys for each region, i.e., different encryption keys for each tenant. In other words, the controller 4 manages a management table which manages correspondence between the plural regions and the plural encryption keys and, in a case of receiving a read/write request that designates a certain region ID from the host 2, selects an encryption key associated with the region indicated by the region ID as an encryption key to be used for the data encryption (or decryption).

Since the controller 4 manages the information indicative of correspondence between the regions and the blocks belonging to respective regions, the controller 4 can also select an encryption key corresponding to the region to which the block having the block address designated by the read/write request belongs, as the encryption key to be used for the data encryption (or decryption). Thus, a read/write request including no region ID can also be used in the present embodiment.

The plural regions may be implemented by plural namespaces. Each of the namespaces is a region (storage region) in the NAND flash memory 5, and a logical address space (LBA range) is allocated to each of the namespaces. The individual namespaces are identified by identifiers of the namespaces (namespace IDs: NSIDs). LBA ranges (LBA0 to LBAn−1) are allocated to each region. The size of the LBA range (that is, the number of LBAs) is variable for each region (namespace). Each LBA range starts with LBA0. In a case where the plural regions are implemented by plural namespaces, each read/write request may include or may not include the namespace ID as the region ID. If each read/write request includes the namespace ID, the controller 4 can select an encryption key associated with the region (namespace) indicated by the namespace ID designated by the read/write request received from the host 2, as the encryption key to be used for the data encryption (or decryption). If each read/write request does not include the namespace ID, the controller 4 can select the encryption key associated with the region (namespace) to which the block having the designated block address belongs, as the encryption key to be used for the data encryption (or decryption), on the basis of the block address designated by the read/write request received from the host 2.

Alternatively, each block may be used as a region. In this case, in general, encryption of data (user data) may be executed using different encryption keys for each block. The controller 4 can also select the encryption key associated with the block having the designated block address, as the encryption key to be used for the data encryption (or decryption), on the basis of the block address designated by the read/write request received from the host 2.

When a write request (write command) designating a physical address (block address and block offset) is received from the host 2, the write operation control unit 21 first encrypts data (write data) from the host 2 with an encryption key (first encryption key) selected from the plural encryption keys and the physical address included in the write request. In this case, an operation for encrypting the data is executed using the encryption/decryption circuit 15. The encryption key selected from the plural encryption keys may be an encryption key associated with the block or the region (for example, namespace) to which the block belongs.

Then, the write operation control unit 21 writes the encrypted data to the physical storage location (write destination location) in the block (write destination block) designated by the physical address (block address and block offset).

The read operation control unit 22 receives from the host 2 a read request (read command) designating a physical address indicative of a physical storage location in the NAND flash memory 5 where the encrypted data is stored. The physical address is represented by the block address of the above-explained block where the above-explained encrypted data is stored, and the block offset indicative of the physical storage location in the block where the above-explained encrypted data is stored.

When the read request (read command) is received from the host 2, the read operation control unit 22 reads the encrypted data from the block, on the basis of the physical address designated by the read request, and decrypts the read encrypted data with the encryption key (above-explained first encryption key) associated with the block or the region to which the block belongs, and the physical address included in the read request. In this case, an operation for decrypting the data is executed by the encryption/decryption circuit 15.

The copy operation control unit 23 executes an operation of copying encrypted data from a copy source block to a copy destination block. The copy operation may be an operation of simply copying the specified encrypted data alone from the copy source block to the copy destination block, an operation of copying only the valid encrypted data in the copy source block to the copy destination block for garbage collection, or an operation of copying all the encrypted data in the copy source block to the copy destination block for wear leveling. This copy operation may be executed in response to a copy request (copy command) received from the host 2.

When the operation of copying the encrypted data from the copy source block to the physical storage location in the copy destination block (copy destination physical storage location) is to be executed, the copy operation control unit 23 decrypts the encrypted data with the encryption key associated with the copy source block or the region to which the copy source block belongs, and the physical address indicative of the physical storage location where the encrypted data is stored. Then, the copy operation control unit 23 re-encrypts the decrypted data with the encryption key associated with the copy destination block or the region to which the copy destination block belongs, and the physical address indicative of the copy destination physical storage location in the copy destination block. Then, the copy operation control unit 23 writes the re-encrypted data to the copy destination physical storage location in the copy destination block.

The copy operation control unit 23 executes the following operations, for example when the copy operation control unit 23 receives a copy request from the host 2.

The copy request designates a copy source physical address indicative of a certain copy source physical storage location in a certain copy source block, and a copy destination physical address indicative of a certain copy destination physical storage location in a certain copy destination block. The copy operation control unit 23 reads encrypted data from the copy source physical storage location in the copy source block, and decrypts the read encrypted data with an encryption key associated with the copy source block or the region to which the copy source block belongs, and the copy source physical address. Then, the copy operation control unit 23 re-encrypts the decrypted data with an encryption key associated with the copy destination block or the region to which the copy destination block belongs, and the copy destination physical address, and writes the re-encrypted data to the copy destination physical storage location in the copy destination block.

The NAND interface 13 is a memory control circuit configured to control the NAND flash memory 5 under the control of the CPU 12. The DRAM interface 14 is a DRAM control circuit configured to control the DRAM 6 under the control of the CPU 12. A part of a storage region of the DRAM 6 is used as the read buffer (RB) 30 and the write buffer (WB) 31. In addition, the other part of the storage region in the DRAM 6 is used to store the system management information 33.

The system management information 33 includes a table to manage correspondence between each of the regions and each of the block addresses, a table to manage correspondence between each of the regions (or blocks) and each of the encryption keys, and the like.

The read buffer (RB) 30, the write buffer (WB) 31, and the system management information 33 may be in an SRAM (not illustrated) in the controller 4.

As explained above, the host 2 is a computer such as a server and is configured to execute various programs. The programs executed by the host 2 include, for example, an application software layer 41, an operating system 42, a file system 43, and a device driver 44.

As is generally known, the operating system 42 is software configured to manage the entire host 2, to control the hardware in the host 2, and to execute the control to enable an application to use the hardware and the flash storage device 3. The file system 43 and the device driver 44 may be incorporated in the operating system 42.

The file system 43 is used to control file operations (for example, creating, storing, updating, and erasing).

Various application software threads run on the application software layer 41. Examples of the application software threads include client software, database software, and a virtual machine.

The device driver 44 controls the flash storage device 3 under the control of the file system 43.

The operating system 42 may further incorporate a flash translation layer (FTL) 2A for managing a lookup table (LUT) 2B which functions as an address translation table.

The lookup table (LUT) 2B manages mapping between each of tags (for example, logical addresses such as LBA) for identifying individual data and each of physical addresses indicative of individual physical storage locations in the flash storage device 3 (i.e., NAND flash memory 5).

FIG. 5 illustrates an outline of a data write operation, a data read operation, and a data copy operation together with a flow of data, block address, and page address.

<Data Write Operation>

When the host 2 needs to write data (write data) to the flash storage device 3, the host 2 determines a physical address indicative of a location (physical storage location) to which the write data is to be written. The physical address is represented by a block address designating a block (write destination block) to which the write data is to be written, and a block offset (simply referred to as offset) indicative of a location in the write destination block to which the write data is to be written. The block offset can be represented by a page address and a page offset, but the block offset in FIG. 5 is represented by the page address alone to simplify the illustration.

The host 2 incorporates FTL 2A which manages LUT 2B as explained above. FTL 2A manages LUT 2B which is an address translation table for managing the mapping between each of tags (for example, LBA) and each of the physical addresses of the NAND flash memory 5.

When the host 2 determines the physical address to which the write data is to be written, FTL 2A updates LUT 2B and maps the determined physical address (block address and block offset (page address)) to the tag (for example, LBA) corresponding to the write data.

Then, the host 2 sends the write request to designate the block address and the block offset (page address) to the flash storage device 3.

The encryption/decryption circuit 15 encrypts the write data with the physical address included in the write request and an encryption key selected from the plural encryption keys stored in an encryption key storage region 80. The encryption key storage region 80 includes an encryption key management table where the plural encryption keys are stored. The plural encryption keys associated with respective plural regions (for example, plural namespaces) may have been stored in the encryption key management table of the encryption key storage region 80, or the plural encryption keys associated with respective plural block addresses may have been stored in the encryption key management table of the encryption key storage region 80.

In a case where the plural encryption keys associated with respective plural regions such as namespaces have been stored in the encryption key management table of the encryption key storage region 80, the encryption key associated with the region (namespace) to which the block having the block address included in the write request belongs may be selected from the plural encryption keys. If the write request includes a namespace ID, the encryption key associated with the region (namespace) designated by this namespace ID may be selected from the plural encryption keys.

In a case where the plural encryption keys associated with respective plural block addresses have been stored in the encryption key management table of the encryption key storage region 80, the encryption key associated with the block address included in the write request may be selected from the plural encryption keys.

The write operation control unit 21 writes the encrypted write data to the write destination location in the write destination block, on the basis of the physical address (block address and block offset (page address)) designated by the write request.

In data write operation, the write operation control unit 21 may perform the following operations.

The write operation control unit 21 receives the write request and the write data from the host 2, sends the received write data and the physical address (block address, block offset (page address)) included in the received write request, to the encryption/decryption circuit 15, selects an encryption key associated with the region ID (or block address) included in the received write request from the encryption key storage region 80, and sends the selected encryption key to the encryption/decryption circuit 15.

<Data Read Operation>

When the host 2 needs to read data from the flash storage device 3, the host 2 acquires the physical address (block address and block offset (page address)) corresponding to the tag (LBA) of the data to be read, from LUT 2B, by referring to LUT 2B.

Then, the host 2 sends a read request for designating the acquired block address and the block offset (page address) to the flash storage device 3. When the controller 4 (more specifically, read operation control unit 22) of the flash storage device 3 receives the read request from the host 2, the controller 4 (read operation control unit 22) specifies a read target block and a read target physical storage location in the read target block, on the basis of the block address and the block offset (page address). Then, the controller 4 (read operation control unit 22) reads the encrypted data from the specified read target physical storage location in the specified read target block.

Next, the read encrypted data is decrypted by the encryption/decryption circuit 15. The encryption/decryption circuit 15 decrypts the read encrypted data with the physical address included in the read command and the encryption key associated with the read target block (or the region to which the read target block belongs). Then, the controller 4 sends the decrypted data to the host 2.

<Data Copy Operation>

When the host 2 needs execution of a data copy operation, the host 2 determines a copy source physical address (copy source block address and block offset) and a copy destination physical address (copy destination block address and block offset). The data copy operation may be an operation of simply copying the specified encrypted data alone from the copy source block to the copy destination block, an operation of copying only the valid encrypted data in the copy source block to the copy destination block for garbage collection (GC), or an operation of copying all the encrypted data in the copy source block to the copy destination block for wear leveling.

Then, the host 2 sends a copy request designating the copy source physical address and the copy destination physical address to the flash storage device 3. When the copy operation control unit 23 of the flash storage device 3 receives the copy request from the host 2, the copy operation control unit 23 specifies the physical storage location in the block (copy source block) where the data to be copied is stored, on the basis of the copy source physical address, and reads the encrypted data from the physical storage location in the copy source block.

Next, the read encrypted data is decrypted by the encryption/decryption circuit 15. The encryption/decryption circuit 15 decrypts the read encrypted data with the copy source physical address included in the copy request, and the encryption key associated with the copy source block (or the region to which the copy source block belongs).

Then, the decrypted data is re-encrypted by the encryption/decryption circuit 15. The encryption/decryption circuit 15 re-encrypts the decrypted data with the copy destination physical address included in the copy request, and the encryption key associated with the copy destination block (or the region to which the copy destination block belongs).

The encryption key used when the read encrypted data is decrypted may be the same as or different from the encryption key used when the decrypted data is re-encrypted. For example, in a case where plural encryption keys are associated with plural regions such as namespaces, respectively, the same encryption key is used in the decryption operation and the re-encryption operation if the copy source block and the copy destination block belong to the same region, but different encryption keys are used in the decryption operation and the re-encryption operation if the copy source block and the copy destination block belong to different regions. In a case where the plural encryption keys are associated with the plural block addresses, respectively, different encryption keys are used in the decryption operation and the re-encryption operation.

Then, the copy operation control unit 23 writes the re-encrypted data to the copy destination physical storage location in the copy destination block, on the basis of the copy destination physical address included in the copy request.

In the data copy operation, the copy operation control unit 23 may perform the following operations.

The copy operation control unit 23 receives the copy request from the host 2, sends the read data and the copy source physical address (block address, block offset (page address)) included in the copy request, to the encryption/decryption circuit 15, selects the encryption key corresponding to the region ID (or copy source block address) included in the received copy request from the encryption key storage region 80, and sends the selected encryption key to the encryption/decryption circuit 15.

In addition, the copy operation control unit 23 sends the decrypted data and the copy destination physical address (block address, block offset (page address)) included in the copy request, to the encryption/decryption circuit 15, selects the encryption key corresponding to the region ID (or copy destination block address) included in the received copy request from the encryption key storage region 80, and sends the selected encryption key to the encryption/decryption circuit 15.

FIG. 6 illustrates encryption and decryption operations executed in the encryption/decryption circuit 15.

As illustrated in the left part of FIG. 6, when a decryption circuit 15A in the encryption/decryption circuit 15 receives write data to be encrypted, address information, and an encryption key, the decryption circuit 15A encrypts the write data with the address information and the encryption key, and outputs the encrypted write data. The address information is a physical address included in a write request received from the host 2. The write data and the address information may be sent from the write operation control unit 21 to the encryption circuit 15A.

In a data copy operation, the address information is a copy destination physical address indicative of the copy destination physical storage location. The data (write data) to be written to the copy destination physical storage location and the copy destination physical address (address information) may be send from the copy operation control unit 23 to the encryption circuit 15A.

The encryption key management table 33A of the encryption key storage region 80 holds plural encryption keys (KEY #0, KEY #1, KEY 2, . . . ) associated with plural region IDs (#0, #1, #2, . . . ), respectively. If a certain region ID (ID #x) is supplied from the write operation control unit 21 to the encryption key storage region 80, the encryption key management table 33A of the encryption key storage region 80 outputs an encryption key (KEY #x) corresponding to the region ID (ID #x). The encryption key (KEY #x) output from the encryption key storage region 80 is sent to the encryption circuit 15A of the encryption/decryption circuit 15.

The processing of encrypting the write data with the address information and the encryption key can be executed in various methods. For example, an encryption algorithm conforming to AES-XTS or other encryption algorithms may be used.

In the processing of encrypting the write data with the address information and the encryption key, for example, the encryption circuit 15A first may change bit pattern of the write data with the address information (physical address), and then may encrypt the changed bit pattern with the encryption key. In the processing of changing the bit pattern of the write data with the address information (physical address), the encryption circuit 15A first may encrypt the address information with an encryption key different from the encryption key for the write data and then change the bit pattern of the write data with the encrypted address information.

As illustrated in the right part of FIG. 6, when a decryption circuit 15B in the encryption/decryption circuit 15 receives encrypted read data, address information, and an encryption key, the decryption circuit 15B decrypts the encrypted read data with the address information and the encryption key, and outputs the decrypted read data. The encrypted read data supplied to the encryption/decryption circuit 15 is encrypted data which is read from the NAND flash memory 5 by the read operation control unit 22. The address information supplied to the encryption/decryption circuit 15 is address information (physical address) included in a read request received from the host 2. The encrypted read data and address information may be sent from the read operation control unit 22 to the decryption circuit 15B.

In a data copy operation, the address information is a copy source physical address indicative of the copy source physical storage location. The encrypted data (read data) read from the copy source physical storage location and the copy source physical address (address information) may be send from the copy operation control unit 23 to the decryption circuit 15B.

As explained above, the encryption key management table 33A of the encryption key storage region 80 holds plural encryption keys (KEY #0, KEY #1, KEY 2, . . . ) associated with plural region IDs (#0, #1, #2, . . . ), respectively. If a certain region ID (ID #x) is supplied from the read operation control unit 22 to the encryption key storage region 80, the encryption key management table 33A of the encryption key storage region 80 outputs the encryption key (KEY #x) corresponding to the region ID (ID #x). The encryption key (KEY #x) output from the encryption key storage region 80 is sent to the decryption circuit 15B of the encryption/decryption circuit 15.

In the processing of decrypting the encrypted read data, the decryption circuit 15B may first change a bit pattern of the encrypted read data with the address information (physical address), and may decrypt the changed bit pattern with the encryption key.

FIG. 7 illustrates a namespace/encryption key management table.

A namespace/encryption key management table 33A' mat be used as the encryption key management table 33A included in the encryption key storage region 80 illustrated in FIG. 6. Encryption keys KEY #0, KEY #1, KEY #2, KEY #3, KEY #4, . . . , and KEY #k that correspond to NSID #0, NSID #1, NSID #2, NSID #3, NSID #4, . . . , and NSID #k, respectively, are managed in the namespace/encryption key management table 33A'. In a case where the namespace/encryption key management table 33A' is used as the encryption key management table 33A included in the encryption key storage region 80 illustrated in FIG. 6, different encryption keys can be used for each of the namespaces.

FIG. 8 illustrates a block/encryption key management table.

A block/encryption key management table 33B may be used as the encryption key management table 33A included in the encryption key storage region 80 illustrated in FIG. 6. Encryption keys KEY #0, KEY #1, KEY #2, KEY #3, KEY #4, . . . that correspond to block addresses BLK #0, BLK #1, BLK #2, BLK #3, BLK #4, . . . , respectively, are managed in the block/encryption key management table 33B. In a case where the block/encryption key management table 33B is used as the encryption key management table 33A included in the encryption key storage region 80 illustrated in FIG. 6, the block/encryption key management table 33B can select an encryption key corresponding to the block address included in a write/read/copy request from the plural encryption keys included in the encryption key storage region 80.

FIG. 9 illustrates a write operation executed in response to a write command.

It is assumed that the block address included in the write command is indicative of block BLK #0. The write operation control unit 21 writes the encrypted data in a page unit, in order of page 0, page 1, page 2, . . . page n, to the block BLK #0.

In FIG. 9, it is assumed that the write command designating the physical address (BLK #0, offset +4) and the length (=4) has been received from the host 2 in a state in which 16 KB encrypted data have already been written to page 0 of block BLK #0. In this case, the write operation control unit 21 writes 16 KB write data encrypted by the encryption circuit 15A to page 1 of block BLK #0.

FIG. 10 illustrates a read operation executed in the flash storage device 3.

In FIG. 10, it is assumed that a read command designating the physical address (BLK #0, offset (=+4)), the length (=4) is received from the host 2. The read operation control unit 22 of the flash storage device 3 reads 16 KB user data (encrypted data) stored in page 1 of block BLK #0, on the basis of the physical address (BLK #0, offset (=+4)) and the length (=4), and sends the read 16 KB user data (encrypted data) to the decryption circuit 15B.

FIG. 11 illustrates a sequence of write processing executed in the host 2 and the flash storage device 3.

It is assumed that the namespace/encryption key management table 33A' illustrated in FIG. 7 is used as the encryption key management table 33A incorporated in the encryption key storage region 80 illustrated in FIG. 6.

The host 2 first determines a physical address (block address and offset) indicative of a location where write data is to be written. Then, the host 2 sends a write command including the physical address (block address, offset) determined by itself, the namespace ID, and the length to the flash storage device 3.

When the controller 4 of the flash storage device 3 receives the write command, the controller 4 encrypts the write data associated with the write command with the physical address included in the write command and an encryption key corresponding to the namespace ID included in the write command (step S11).

Next, the write operation control unit 21 writes the encrypted write data to the location indicated by the physical address included in the write command (step S12).

Then, the controller 4 returns a response to the write command to the host 2 (step S13). The response is returned to notify the host 2 of the completion of command.

FIG. 12 illustrates a sequence of read processing executed in the host 2 and the flash storage device 3.

It is assumed that the namespace/encryption key management table 33A' illustrated in FIG. 7 is used as the encryption key management table 33A incorporated in the encryption key storage region 80 illustrated in FIG. 6.

The host 2 translates a tag (LBA) included in a read request from the user application into a physical address (block address, offset) by referring to LUT 2B managed by the host 2. Then, the host 2 sends a read command designating the physical address (block address, offset), the namespace ID, and the length to the flash storage device 3.

When the controller 4 of the flash storage device 3 receives the read command from the host 2, the read operation control unit 22 reads encrypted data from the location indicated by the physical address (block address, offset) included in the read command (step S21).

In step S21, the controller 4 selects a block corresponding to the block address designated by the read command as a read target block, and selects a read target page in the read target block on the basis of the offset designated by the read command. At this time, the controller 4 may first divide the offset designated by the read command by the number of grains (4 in this case) indicative of the page size. Then, the controller 4 may select a quotient and a remainder obtained by the division as the page address to be read and the page offset location to be read, respectively. The page address and the page offset may be included in the read command as the offset (block offset). The controller 4 reads the encrypted data from the NAND flash memory 5, on the basis of the physical address (block address, offset) and the length.

Next, the controller 4 decrypts the read data (encrypted data) with the physical address included in the read command and the encryption key corresponding to the namespace ID included in the read command (step S22). Then, the controller 4 sends the decrypted data to the host 2.

FIG. 13 illustrates a procedure of a data copy operation.

It is assumed that the namespace/encryption key management table 33A' illustrated in FIG. 7 is used as the encryption key management table 33A incorporated in the encryption key storage region 80 illustrated in FIG. 6. In addition, the data copy is assumed to be performed in a GC operation.

For example, if the number of remaining free blocks included in the free block list managed by the host 2 becomes smaller than a threshold value, the host 2 determines a copy source physical address (copy source block address, offset) and a copy destination physical address (copy destination block address, offset) and sends a copy command designating the determined copy source physical address (copy source block address, offset) and the determined copy destination physical address (copy destination block address, offset) to the flash storage device 3. The copy source block indicated by the copy source block address and the copy destination block indicated by the copy destination block address may be different blocks belonging to the same namespace or may be different blocks belonging to different namespaces.

When the flash storage device 3 receives the copy command, the copy operation control unit 23 of the controller 4 of the flash storage device 3 reads, from the location indicated by the copy source physical address included in the copy command, encrypted data (valid data) to be copied (step S31).

Then, the controller 4 decrypts the read encrypted data (valid data) with the copy source physical address included in the copy command, and the encryption key corresponding to the namespace to which the copy source block indicated by the copy source block address included in the copy command belongs (step S32). The controller 4 specifies the copy source block indicated by the copy source block address, on the basis of the copy source block address, and specifies the namespace to which the specified copy source block belongs. The controller 4 acquires the encryption key corresponding to the specified namespace from the namespace/encryption key management table 33A' and uses the acquired encryption key in the decryption operation.

Next, the controller 4 re-encrypts the decrypted data with the copy destination physical address included in the copy command, and the encryption key corresponding to the namespace to which the copy destination block indicated by the copy destination block address included in the copy command belongs (step S33). The controller 4 specifies the copy destination block indicated by the copy destination block address, on the basis of the copy destination block address, and specifies the namespace to which the specified copy destination block belongs. The controller 4 acquires the encryption key corresponding to the specified namespace from the namespace/encryption key management table 33A' and uses the acquired encryption key in the re-encryption operation.

The encryption key used in the decryption and the encryption key used in the re-encryption are the same if the copy source block indicated by the copy source block address and the copy destination block indicated by the copy destination block address belong to the same namespace, but the encryption key used in the decryption and the encryption key used in the re-encryption are different from each other if the copy source block and the copy destination block belong to the different namespaces.

Next, the copy operation control unit 23 writes the re-encrypted data to the location indicated by the copy destination physical address (step S34).

After completion in step S34, the controller 4 sends a response to notify the host 2 of the completion of data copy operation. On the host 2 side, when the host 2 receives the response from the flash storage device 3, FTL 2A updates LUT 2B and maps the copy destination physical address to a tag (for example, LBA) corresponding to the copied data.

The copy command may include plural copy source physical addresses indicative of plural copy source physical storage locations, and plural copy destination physical addresses indicative of plural copy destination physical storage locations. In such a case, in the data copy operation, while decrypting and re-encrypting plural encrypted data portions, the controller 4 executes an operation of copying the plural encrypted data portions from the plural copy source physical storage locations to the plural copy destination physical storage locations, respectively.

In addition, the copy command may include a namespace ID. If the copy source block and the copy destination block belong to the same namespace, the copy command includes a namespace ID indicative of the namespace to which the copy source block and the copy destination block belong. In contrast, if the copy source block and the copy destination block belong to different namespaces, the copy command includes a namespace ID indicative of a namespace to which the copy source block belongs and a namespace ID indicative of a namespace to which the copy destination block belongs.

If the namespace ID is included in the copy command, the controller 4 may acquire the encryption key corresponding to the namespace ID included in the copy command from the namespace/encryption key management table 33A' in steps S32 and S33.

FIG. 14 illustrates an example of a data copy operation.

It is assumed that the namespace/encryption key management table 33A' illustrated in FIG. 7 is used as the encryption key management table 33A incorporated in the encryption key storage region 80 illustrated in FIG. 6.

In FIG. 14, it is assumed that data d4 stored in a location corresponding to offset +4 of the copy source block (block BLK #0) is to be copied to a location corresponding to offset +0 of the copy destination block (block BLK #2). In addition, it is assumed that block BLK #0 and block #2 belong to the same namespace (NS #0).

The copy operation control unit 23 reads the encrypted data d4 stored in a location indicated by the copy source physical address (BLK #0, offset (=+4)), and sends the encrypted data d4 to the decryption circuit 15B of the encryption/decryption circuit 15. The encrypted data d4 is decrypted with the copy source physical address (BLK #0, offset (=+4)), and encryption key KEY #0 corresponding to namespace NS #0 indicative of the namespace to which the copy source block (block BLK #0) belongs.

After that, the copy operation control unit 23 sends the decrypted data d4 to the encryption circuit 15A of the encryption/decryption circuit 15. The decrypted data d4 is re-encrypted with the copy destination physical address (BLK #2, offset (=+0)), and encryption key KEY #0 corresponding to namespace NS #0 indicative of the namespace to which the copy destination block (block BLK #2) belongs, in the encryption circuit 15A of the encryption/decryption circuit 15. Next, the copy operation control unit 23 writes the re-encrypted data d4 to a location indicated by the copy destination physical address (BLK #2, offset (=+0)).

In FIG. 14, it is assumed that block BLK #0 and block #2 belong to the namespace NS #0, but the copy destination block and the copy source block may belong to different namespaces.

FIG. 15 illustrates another sequence of the write processing executed in the host 2 and the flash storage device 3.

It is assumed that the block/encryption key management table 33B illustrated in FIG. 8 is used as the encryption key management table 33A incorporated in the encryption key storage region 80 illustrated in FIG. 6.

The host 2 first determines a physical address (block address and offset) indicative of a location where write data is to be written. Then, the host 2 sends a write command including the determined physical address (block address, offset) and a length to the flash storage device 3. The write command may include a namespace ID.

When the controller 4 of the flash storage device 3 receives the write command, the controller 4 encrypts the write data associated with the write command with the physical address included in the write command and the encryption key corresponding to the block indicated by the block address included in the write command (step S41).

Next, the write operation control unit 21 writes the encrypted write data to a location indicated by the physical address included in the write command (step S42).

Then, the controller 4 returns a response to the write command to the host 2 (step S43). The response is returned to notify the host 2 of the completion of command.

FIG. 16 illustrates another sequence of the read processing executed in the host 2 and the flash storage device 3.

It is assumed that the block/encryption key management table 33B illustrated in FIG. 8 is used as the encryption key management table 33A incorporated in the encryption key storage region 80 illustrated in FIG. 6.

The host 2 translates the tag (LBA) included in the read request from the user application into a physical address (block address, offset) by referring to LUT 2B managed in the host 2. Then, the host 2 sends a read command designating the physical address (block address, offset) and a length to the flash storage device 3. The read command may include the namespace ID.

When the controller 4 of the flash storage device 3 receives the read command from the host 2, the read operation control unit 22 reads encrypted data from a location indicated by the physical address (block address, offset) included in the read command (step S51).

In step S51, the controller 4 determines a block corresponding to the block address designated by the read command as a read target block, and determines a read target page, on the basis of the offset designated by the read command. At this time, the controller 4 may first divide the offset designated by the read command by the number of grains (4 in this case) indicative of the page size. Then, the controller 4 may determine a quotient and a remainder obtained by the division as the page address to be read and the page offset location to be read, respectively. The page address and the page offset may be included in the read command as the offset (block offset).

The controller 4 reads the encrypted data from the NAND flash memory 5, on the basis of the physical address (block address, offset) and the length.

Next, the controller 4 decrypts the read data (encrypted data) with the physical address included in the read command and the encryption key corresponding to the block indicated by the block address (part of physical address) included in the read command (step S52). Then, the controller 4 sends the decrypted data to the host 2.

Figure 17:
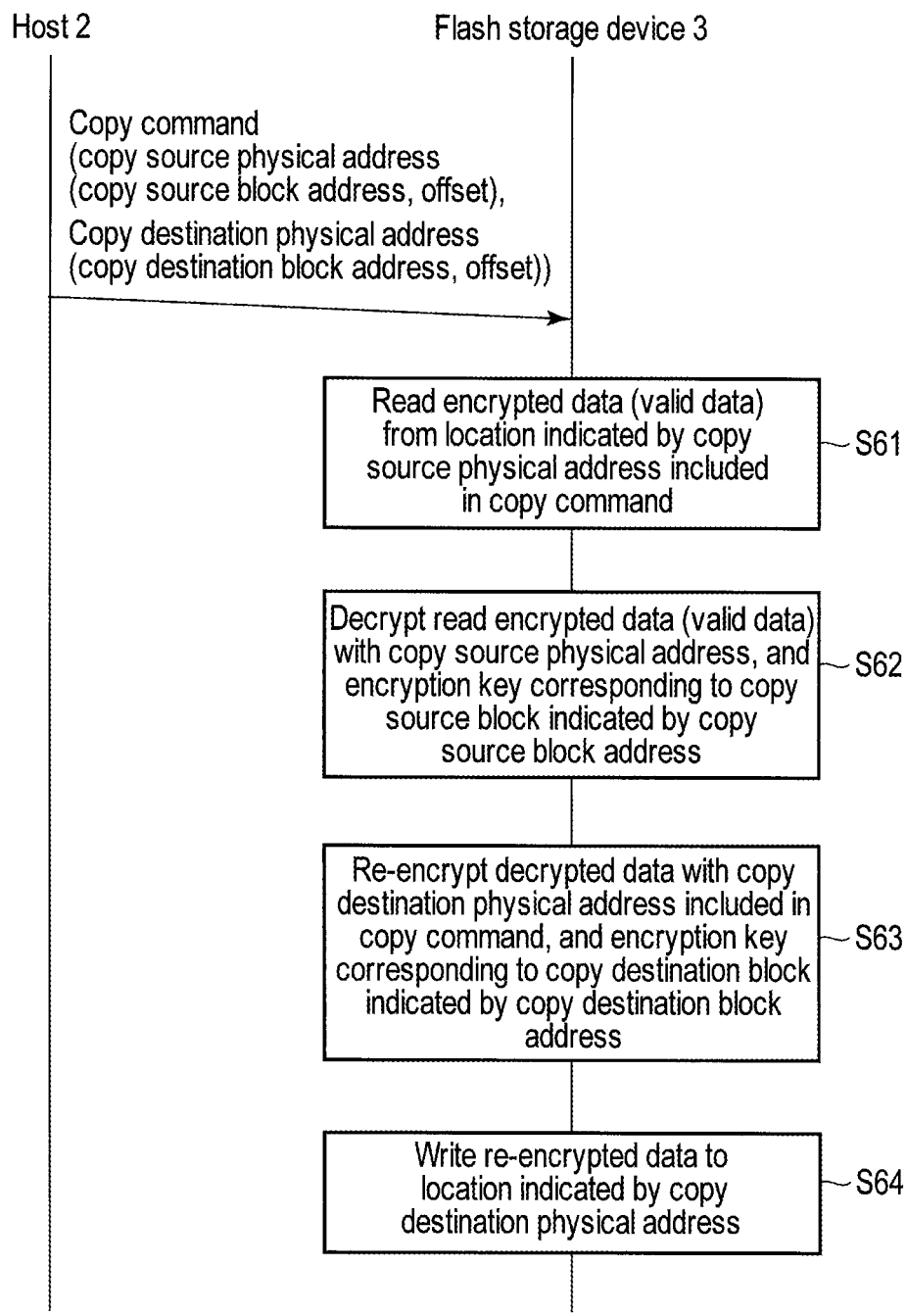
FIG. 17 is a sequence chart illustrating another sequence of copy processing executed in the host and the memory system according to the embodiment.

FIG. 17 illustrates another procedure of the data copy operation.

It is assumed that the block/encryption key management table 33B illustrated in FIG. 8 is used as the encryption key management table 33A incorporated in the encryption key storage region 80 illustrated in FIG. 6. In addition, the data copy is assumed to be performed in a GC operation.

For example, if the number of remaining free blocks included in the free block list managed by the host 2 becomes smaller than a threshold value, the host 2 determines a copy source physical address (copy source block address, offset) and a copy destination physical address (copy destination block address, offset) and sends a copy command designating the determined copy source physical address (copy source block address, offset) and the determined copy destination physical address (copy destination block address, offset) to the flash storage device 3.

When the flash storage device 3 receives the copy command, the copy operation control unit 23 of the controller 4 of the flash storage device 3 reads encrypted data (valid data) from a location indicated by the copy source physical address included in the copy command (step S61).

Then, the controller 4 decrypts the read encrypted data (valid data) with the copy source physical address included in the copy command, and an encryption key corresponding to the copy source block indicated by the copy source block address included in the copy command (step S62). The controller 4 specifies the copy source block indicated by the copy source block address, on the basis of the copy source block address, acquires the encryption key corresponding to the specified copy source block from the block/encryption key management table 33B, and uses the acquired encryption key for the decryption operation.

Next, the controller 4 re-encrypts the decrypted data with the copy destination physical address included in the copy command, and an encryption key corresponding to the copy destination block indicated by the copy destination block address included in the copy command (step S63). The controller 4 specifies the copy destination block indicated by the copy destination block address, on the basis of the copy destination block address, acquires the encryption key corresponding to the specified copy destination block from the block/encryption key management table 33B, and uses the acquired encryption key for the re-encryption operation.

Since the encryption key is associated with each block, the encryption key used in the decryption and the encryption key used in the re-encryption are different from each other.

Next, the copy operation control unit 23 writes the re-encrypted data to a location indicated by the copy destination physical address (step S64).

After completion in step S64, the controller 4 sends a response to notify the host 2 of the completion of the data copy operation to the host 2. On the host 2 side, when the host 2 receives the response from the flash storage device 3, FTL 2A updates LUT 2B and maps the copy destination physical address to a tag (for example, LBA) corresponding to the copied data.

The copy command may include plural copy source physical addresses indicative of plural copy source physical storage locations, and plural copy destination physical addresses indicative of plural copy destination physical storage locations.

In addition, the copy command may include a namespace ID. If the copy source block and the copy destination block belong to the same namespace, the copy command includes a namespace ID indicative of the namespace to which the copy source block and the copy destination block belong. If the copy source block and the copy destination block belong to different namespaces, the copy command includes a namespace ID indicative of a namespace to which the copy source block belongs and a namespace ID indicative of a namespace to which the copy destination block belongs.

FIG. 18 illustrates still another procedure of the data copy operation.

It is assumed that the block/encryption key management table 33B illustrated in FIG. 8 is used as the encryption key management table 33A incorporated in the encryption key storage region 80 illustrated in FIG. 6.

In FIG. 18, it is assumed that data d4 stored in a location corresponding to offset +4 of the copy source block (block BLK #0) is copied to a location corresponding to offset +0 of the copy destination block (block BLK #1).

The copy operation control unit 23 reads encrypted data d4 stored in the location indicated by the copy source physical address (BLK #0, offset (=+4)), and sends the encrypted data d4 to the decryption circuit 15B of the encryption/decryption circuit 15. In the decryption circuit 15B of the encryption/decryption circuit 15, the encrypted data d4 is decrypted with the copy source physical address (BLK #0, offset (=+4)), and an encryption key KEY #0 corresponding to the copy source block address (block BLK #0).

After that, the copy operation control unit 23 sends the decrypted data d4 to the encryption circuit 15A of the encryption/decryption circuit 15. In the encryption circuit 15A of the encryption/decryption circuit 15, the decrypted data d4 is re-encrypted with the copy destination physical address (BLK #1, offset (=+0)), and an encryption key KEY #1 corresponding to the copy destination block address (block BLK #1). Next, the copy operation control unit 23 writes the re-encrypted data d4 to the location indicated by the copy destination physical address (BLK #1, offset (=+0)).

FIG. 19 illustrates a write command issued to the flash storage device 3.

The write command is a command to request the flash storage device 3 to write data. The write command may include a command ID, a namespace ID, a physical address PBA, a length, and the like.

The command ID is an ID (command code) indicating that this command is the write command, and the command ID for the write command is included in the write command.

The namespace ID is an identifier indicative of one of the plural regions of the NAND flash memory 5 and is indicative of the region where the data is to be written.

The physical address PBA is indicative of a first physical storage location where the data is to be written. The physical address PBA is designated by the block address and the offset (block offset).

The length is indicative of a length of the write data to be written. This length (data length) may be designated by the number of grains, or the size (data length) of the data may be designated by the bytes.

FIG. 20 illustrates a read command issued to the flash storage device 3.

The read command is a command to request the flash storage device 3 to read data. The read command may include a command ID, a namespace ID, a physical address PBA, a length, and the like.

The command ID is an ID (command code) indicating that this command is the read command, and the command ID for read command is included in the read command.

The namespace ID is an identifier indicative of one of the plural regions of the NAND flash memory 5 and is indicative of the region where the data is to be read.

The physical address PBA is indicative of a first physical storage location where the data is to be read. The physical address PBA is designated by the block address and the offset (block offset).

The length is indicative of a length of the data to be read. The data length can be designated by the number of grains.

FIG. 21 illustrates a copy command issued to the flash storage device 3.

The copy command is used to notify the flash storage device 3 of a copy source physical address and a copy destination physical address.

If executing the GC operation is assumed as an example of the data copy operation, the host 2 manages valid data amount/invalid data amount of each block, and can select the valid data in several blocks having a small valid data amount as data to be copied (determination of copy source physical address). In addition, the host 2 manages the free block list, and can determine a location in a free block as the copy destination physical address of the data to be copied. The copy command may include a command ID, the copy source physical address, the copy destination physical address, and the like.

The command ID is an ID (command code) indicating that this command is the copy command, and the command ID for copy command is included in the copy command.

The copy source physical address is indicative of a physical storage location where the data to be copied is stored. The copy source physical address is designated by the copy source block address and the offset (copy source block offset).

The copy destination physical address is indicative of a physical storage location where the data to be copied is to be written. The copy destination physical address is designated by the copy destination block address and the offset (copy destination block offset).

As explained above, according to the present embodiment, when the controller 4 receives from the host 2 a write request to designate a first physical address indicative of a write destination location in a write destination block of the NAND flash memory 5 to which write data is to be written, the write data is encrypted with the first physical address and a first encryption key selected from the plural encryption keys, and the encrypted write data is written to the write destination location in a write destination block.

In addition, when the controller 4 receives a read request to designate the first physical address from the host 2, the encrypted data is read from a read target block, and the read encrypted data is decrypted with the first encryption key and the read target physical storage location (first physical address).

Furthermore, when the encrypted data is to be copied from a copy source block to a copy destination physical storage location in a copy destination block of the NAND flash memory 5, the encrypted data is decrypted with the first encryption key and the copy source physical block (first physical address). In addition, the decrypted data is re-encrypted with a second encryption key selected from plural encryption keys and a copy destination physical address indicative of the copy destination physical storage location in the copy destination block, and the re-encrypted data is written to the second physical storage location in the copy destination block. As a result, since the physical address included in the read request to read the data stored in the copy destination physical storage location becomes the same as the physical address (i.e., copy destination physical address) used to re-encrypt the data, the re-encrypted data can be decrypted correctly. Therefore, in the configuration using a write request to designate a physical address indicative of a physical storage location to which data is to be written and a read request to designate a physical address indicative of a physical storage location where data to be read is stored, even if the data encrypted with the physical address included in the write request is copied to another block, the copied data can be correctly decrypted with the physical address included in the read request to read the data.

In the above-explained embodiment, it is mainly described that the controller 4 executes the data copy operation when receiving a copy request from the host 2, but the controller 4 may execute the data copy operation if the controller 4 determines that the data copy operation needs to be executed, without receiving the copy request.

The flash storage device 3 may be used as one of plural flash storage devices 3 provided in a storage array. The storage array may be connected to the information processing device such as a server computer via a cable or a network. The storage array incorporates a controller which controls plural flash storage devices 3 in the storage array. If the flash storage devices 3 are applied to the storage array, the controller of the storage array may function as the host 2 of the flash storage devices 3.

In addition, in the present embodiment, a NAND flash memory is exemplified as a nonvolatile memory. However, the functions of the present embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system, comprising:
  a nonvolatile memory; and
  a controller electrically connected to the nonvolatile memory and configured to:
  in response to receiving, from a host, a write request that specifies a first address, encrypt data using the first address and a first encryption key, and write the encrypted data to a first location of the nonvolatile memory that corresponds to the first address; and
  in response to receiving, from the host, a copy request that specifies the first address and a second address, the second address being different from the first address, decrypt the encrypted data using the first address and the first encryption key, re-encrypt the decrypted data using the second address and a second encryption key, and write the re-encrypted data to a second location of the nonvolatile memory that corresponds to the second address, the second location being different from the first location.

2. The memory system of claim 1, wherein
  the second encryption key is same as the first encryption key.

3. The memory system of claim 1, wherein
  the second encryption key is different from the first encryption key.

4. The memory system of claim 1, wherein
  the nonvolatile memory includes a plurality of blocks, and
  the first address designates at least a block address of the first location and the second address designates at least a block address of the second location.

5. The memory system of claim 1, wherein
  the copy request specifies, as a copy source, an address range including the first address, and the copy request specifies, as a copy destination, an address range including the second address.

6. The memory system of claim 1, wherein the controller is configured to:
in encrypting the data using the first address and the first encryption key, convert the data using the first address and then encrypt the converted data using the first encryption key; and
in re-encrypting the decrypted data using the second address and the second encryption key, convert the decrypted data using the second address and then re-encrypt the converted decrypted-data using the second encryption key.

7. The memory system of claim 6, wherein the controller is configured to:
convert the data by encrypting the data using the first address; and
convert the decrypted data by encrypting the decrypted data using the second address.

8. The memory system of claim 1, wherein the controller is configured to select the first encryption key and the second encryption key from a plurality of encryption keys.

9. The memory system of claim 8, wherein the controller is further configured to:
manage correspondence between the plurality of encryption keys and a plurality of regions obtained by logically dividing the nonvolatile memory;
select an encryption key associated with a first region to which the first location belongs, as the first encryption key; and
select an encryption key associated with a second region to which the second location belongs, as the second encryption key.

10. The memory system of claim 8, wherein the nonvolatile memory includes a plurality of blocks, and the controller is further configured to:
manage correspondence between the plurality of encryption keys and the plurality of blocks;
select an encryption key associated with a first block to which the first location belongs, as the first encryption key; and
select an encryption key associated with a second block to which the second location belongs, as the second encryption key.

11. A method of controlling a nonvolatile memory, the method comprising:
in response to receiving, from a host, a write request that specifies a first address, encrypting data using the first address and a first encryption key, and writing the encrypted data to a first location of the nonvolatile memory that corresponds to the first address; and
in response to receiving, from the host, a copy request that specifies the first address and a second address, the second address being different from the first address, decrypting the encrypted data using the first address and the first encryption key, re-encrypting the decrypted data using the second address and a second encryption key, and writing the re-encrypted data to a second location of the nonvolatile memory that corresponds to the second address, the second location being different from the first location.

12. The method of claim 11, wherein the second encryption key is same as the first encryption key.

13. The method of claim 11, wherein the second encryption key is different from the first encryption key.

14. The method of claim 11, wherein the nonvolatile memory includes a plurality of blocks, and the first address designates at least a block address of the first location and the second address designates at least a block address of the second location.

15. The method of claim 11, wherein the copy request specifies, as a copy source, an address range including the first address, and the copy request specifies, as a copy destination, an address range including the second address.

16. The method of claim 11, wherein
in encrypting the data using the first address and the first encryption key, the data is converted using the first address and then the converted data is encrypted using the first encryption key; and
in re-encrypting the decrypted data using the second address and the second encryption key, the decrypted data is converted using the second address and then the converted decrypted-data is re-encrypted using the second encryption key.

17. The method of claim 16, wherein
the data is converted by encrypting the data using the first address; and
the decrypted data is converted by encrypting the decrypted data using the second address.

18. The method of claim 11, wherein the first encryption key and the second encryption key are selected from a plurality of encryption keys.

19. The method of claim 18, further comprising:
managing correspondence between the plurality of encryption keys and a plurality of regions obtained by logically dividing the nonvolatile memory;
selecting an encryption key associated with a first region to which the first location belongs, as the first encryption key; and
selecting an encryption key associated with a second region to which the second location belongs, as the second encryption key.

20. The method of claim 18, wherein the nonvolatile memory includes a plurality of blocks, and the method further comprises:
managing correspondence between the plurality of encryption keys and the plurality of blocks;
selecting an encryption key associated with a first block to which the first location belongs, as the first encryption key; and
selecting an encryption key associated with a second block to which the second location belongs, as the second encryption key.

* * * * *